(12) United States Patent
Saitoh et al.

(10) Patent No.: US 8,662,233 B2
(45) Date of Patent: Mar. 4, 2014

(54) ENGINE UNIT AND TWO-WHEELED MOTOR VEHICLE WITH SAME

(75) Inventors: Tetsushi Saitoh, Shizuoka (JP); Yumiko Takeuchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/642,604

(22) PCT Filed: Apr. 22, 2011

(86) PCT No.: PCT/JP2011/002365
§ 371 (c)(1),
(2), (4) Date: Nov. 28, 2012

(87) PCT Pub. No.: WO2011/132432
PCT Pub. Date: Oct. 27, 2011

(65) Prior Publication Data
US 2013/0062135 A1    Mar. 14, 2013

(30) Foreign Application Priority Data
Apr. 23, 2010  (JP) .................................. 2010-100314

(51) Int. Cl.
*B62M 7/06*    (2006.01)

(52) U.S. Cl.
USPC .......................................... 180/230; 180/226

(58) Field of Classification Search
USPC .................................................. 180/230, 226
See application file for complete search history.

(56) References Cited

U.S. PATENT DOCUMENTS

| | | | |
|---|---|---|---|
| 6,612,391 B2 * | 9/2003 | Yamauchi | 180/292 |
| 6,672,982 B2 * | 1/2004 | Ikusue et al. | 474/144 |
| 7,823,678 B2 * | 11/2010 | Okano et al. | 180/230 |
| 7,823,684 B2 * | 11/2010 | Shiozaki et al. | 180/292 |
| 7,963,381 B2 * | 6/2011 | Inomori et al. | 192/105 B |
| 8,235,160 B2 * | 8/2012 | Ogasawara et al. | 180/291 |
| 2007/0199755 A1 * | 8/2007 | Takeuchi | 180/221 |
| 2007/0251747 A1 * | 11/2007 | Kosugi | 180/230 |

FOREIGN PATENT DOCUMENTS

| | | |
|---|---|---|
| JP | 58-124851 A | 7/1983 |
| JP | 59-86734 A | 5/1984 |
| JP | 1-104462 U | 7/1989 |
| JP | 3-219159 A | 9/1991 |
| JP | 2007-315434 A | 12/2007 |

OTHER PUBLICATIONS

Official Communication issued in International Patent Application No. PCT/JP2011/002365, mailed on Jul. 19, 2011.

\* cited by examiner

*Primary Examiner* — Tony Winner
(74) *Attorney, Agent, or Firm* — Keating & Bennett, LLP

(57) ABSTRACT

In an engine unit, a drive unit case includes a crank shaft disposed in a left-right direction of a vehicle, a drive shaft and a second main shaft. A transmission shaft is parallel or substantially parallel to the drive shaft and transmits rotational power, which has been transmitted via a middle gear, to a propeller shaft. A second clutch, which transmits rotational power from the crank shaft to the second main shaft, is freely detachably connected to an end of one side of the second main shaft which protrudes from a drive unit case more than the end of one side of the drive shaft, at a position that overlaps with at least one section of the middle gear on the side of the shaft direction of the drive shaft.

7 Claims, 14 Drawing Sheets

FORWARD TORQUE DIRECTION

FORWARD TORQUE DIRECTION

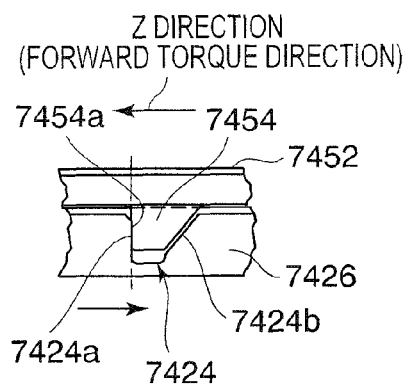
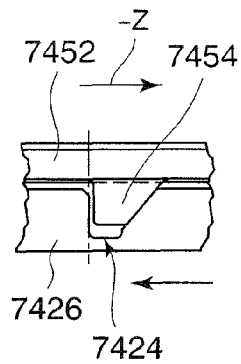
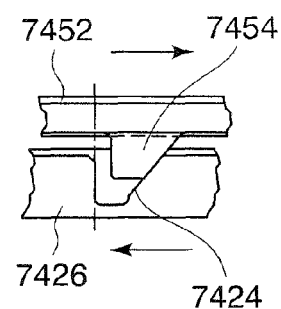
FIG. 14A  FIG. 14B  FIG. 14C
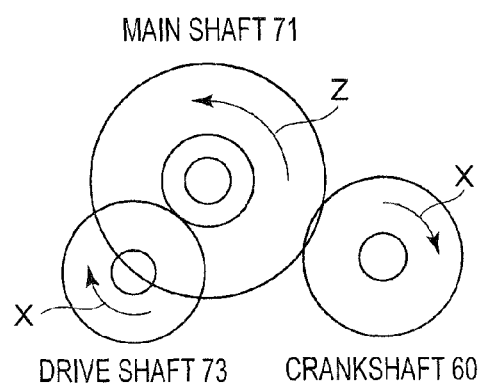
FIG. 15

ENGINE UNIT AND TWO-WHEELED MOTOR VEHICLE WITH SAME

BACKGROUND OF THE INVENTION

1. Field of the Invention

The present invention relates to an engine unit and a motorcycle equipped therewith.

2. Description of the Related Art

A general motorcycle has been known that, due to its limited mounting space, has an engine crankshaft arranged in a lateral direction of the vehicle body, and has a clutch and a main shaft arranged on an axis parallel to the crankshaft. The clutch is connected to one end of the main shaft and transfers power from the crankshaft to the main shaft. The power transferred to the main shaft is transferred to a counter shaft (an output shaft) that is located opposite and parallel to the main shaft via a gear mission, and is output to the rear wheel via this counter shaft. For example, the power is output to the rear wheel via a drive chain wound around a sprocket attached to one end of the counter shaft. The sprocket is wound by a chain with a gear that rotates the rear wheel and therefore is attached to one end of the counter shaft after an engine unit is mounted on a vehicle with front and rear wheels.

Because the sprocket is attached to the counter shaft as described above after the mounting of an engine unit, the clutch that is incorporated beforehand as the engine unit and is arranged, on the side of one end, coaxially with the main shaft at a short distance from the counter shaft, is attached to an end which is on the side laterally reverse to the end to which the sprocket is attached.

There has also been known a transmission that includes a plurality of clutches in order to permit speedy transmission operations of an automobile (see Japanese Patent Laid-Open No. 58-124851, for example).

In recent years, there has been a demand for mounting a multi-speed transmission provided with a plurality of clutches mounted on a vehicle, on a motorcycle having a limited mounting space. When a multi-speed transmission including a plurality of clutches is mounted on a motorcycle, it is necessary to reduce the size of the transmission itself, and, in addition, due to the structure of the motorcycle on which the transmission is mounted, it is necessary to position the center of gravity approximately centrally in the vehicle width direction together with the mounted engine and create a weight balance that is not biased toward the left or right.

A clutch is comparatively heavy for a member that constitutes the drive transmission system. Consequently, for a multi-speed transmission to be mounted on a conventional motorcycle, there is a demand for positioning a plurality of clutches on both left and right sides of the vehicle body away from each other with respect to a counter shaft and a main shaft that is parallel to the counter shaft, in order to maintain the lateral balance of the transmission itself.

That is to say, there is a demand for making the transmission itself small without increasing the shaft-to-shaft distance in the front-back direction of the vehicle body with respect to the counter shaft in the main shaft, which is achieved by arranging one clutch on an extension of one end on the side where a sprocket is attached in the counter shaft.

SUMMARY OF THE INVENTION

Accordingly, preferred embodiments of the present invention provide an engine unit that can be made small even in a multi-speed transmission provided with a plurality of clutches, and a motorcycle including the engine unit.

According to a first preferred embodiment of the present invention, an engine unit includes a crankshaft extending in a lateral direction or an approximately lateral direction of a vehicle; an output shaft that is parallel or substantially parallel to the crankshaft; a main shaft section that is parallel or substantially parallel to the output shaft, rotates due to rotation power transferred from the crankshaft, and outputs the rotation power to the output shaft via a transmission gear mechanism; a clutch that connects and disconnects the rotation power transferred from the crankshaft to the main shaft section; a transmission shaft that is parallel or substantially parallel to the output shaft and rotates due to the rotation power from the output shaft; a propeller shaft that extends in a front-back direction of the vehicle and rotates due to the rotation power from the transmission shaft and drives a rear wheel; and a drive unit case in which the crankshaft, the main shaft section, the transmission gear mechanism, the output shaft, the transmission shaft, and the propeller shaft are provided in a rotatable fashion. In this engine unit, the main shaft section is provided in the drive unit case such that one end of the main shaft section projects from the drive unit case beyond one end of the output shaft, the one end of the output shaft pointing in the same direction as the one end of the main shaft section; the transmission shaft is configured such that the rotation power is transmitted via an intermediate gear provided at the one end of the output shaft in the lateral direction; and the clutch is detachably connected to the one end of the main shaft section at a position in which the clutch overlaps with at least a portion of the intermediate gear axially sideways from the output shaft.

Furthermore, another preferred embodiment of the present invention provides a motorcycle including an engine unit having the above-described configuration.

According to various preferred embodiments of the present invention, it is possible to make a multi-speed transmission small even in a configuration in which the transmission is provided with a plurality of clutches.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 14A, 14B, and 14C are a schematic diagrams showing the relationship between an operating cam of a press boss section and a follower cam of a boss section.

FIG. 15 is a diagram used to explain the back torque limiting operation in the engine unit according to a preferred embodiment of the present invention.

DETAILED DESCRIPTION OF THE PREFERRED EMBODIMENTS

With reference now to the accompanying drawings, preferred embodiments of the present invention will be explained in detail below. In a preferred embodiment of the present invention, a vehicle including a transmission will be described as a motorcycle. Also, the terms front, rear, left, and right in the description of preferred embodiments of the present invention indicate front, rear, left, and right from the viewpoint of the rider seated on the seat of the motorcycle, for example.

A transmission in an engine unit according to a preferred embodiment preferably includes a plurality of friction drive clutches that implement seamless gear changing by performing power transfer alternately between odd-numbered gears and even-numbered gears, and is mounted on a vehicle (a motorcycle) together with one engine. First, an outline description will be given of a motorcycle on which an engine unit having a transmission is mounted.

(1) Configuration of Motorcycle

Figure 1:
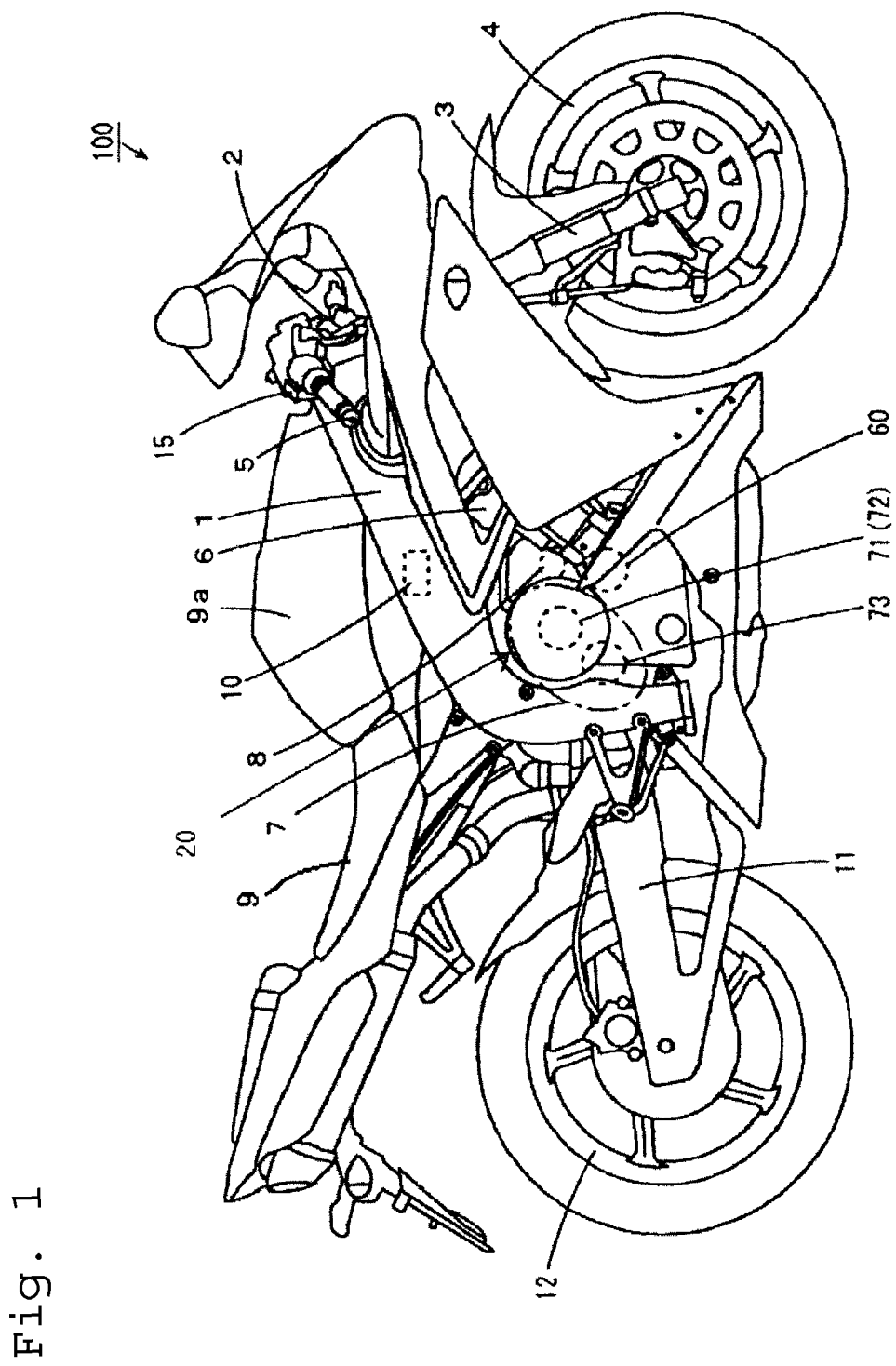
FIG. 1 is a side view of a vehicle including an engine unit according to a preferred embodiment of the present invention.

FIG. 1 is a side view of a vehicle including engine unit 20 according to a preferred embodiment of the present invention.

As shown in FIG. 1, motorcycle 100 preferably includes main frame 1 that is provided with head pipe 2 at the front end, and that extends toward the rear while sloping downward, and in which engine unit 20 including engine 6, transmission 7, motor 8, and so forth, is internally provided. Front fork 3, to which handle 5 is attached at the top, is provided on head pipe 2 in a rotatable fashion, and supports front wheel 4 attached rotatably at the lower end of this front fork 3.

The handle 5 is provided with shift switch 15 that causes a gear change operation by transmission 7 of engine unit 20 (see FIG. 2) due to an operation by the rider. Shift switch 15 includes a shift-up button and shift-down button (not shown). Transmission 7 executes a shift-up operation when the shift-up button is depressed by the rider, and transmission 7 executes a shift-down operation when the shift-down button is depressed by the rider.

In engine unit 20 located inside main frame 1, engine 6 is provided in approximately the center portion of the vehicle, with crankshaft 60 extending approximately horizontally in a direction (a lateral direction) perpendicular to the front-back direction of the vehicle below the cylinder head. At the rear of engine 6, transmission 7 is provided that is connected to crankshaft 60 and uses power input via crankshaft 60.

Figure 2:
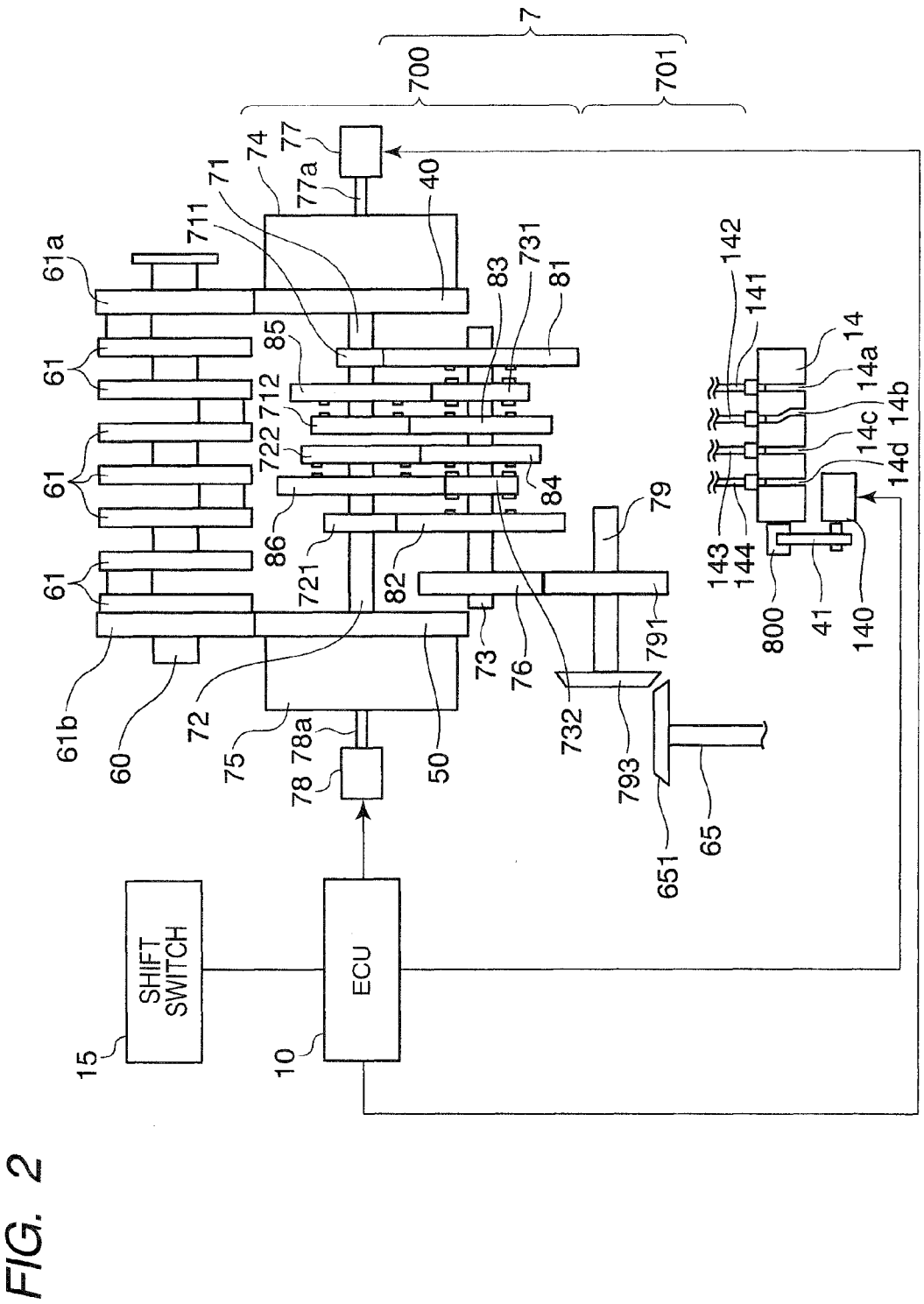
FIG. 2 is a schematic diagram explaining the configuration of the engine unit in FIG. 1.

Between engine 6 and transmission 7, motor 8 is arranged to cause a gear shift by transmission 7, and this motor 8 performs a gear shift by rotary driving of shift cam 14 of shift mechanism 701 of transmission 7 (see FIG. 2).

Rear arm 11 is joined and extends rearward from the rear end of main frame 1, sloping downward. Rear arm 11 rotatably supports rear wheel 12 and a driven gear (not shown) that are integrally provided in rear wheel 12.

On motorcycle 100, seat 9 and fuel tank 9a are located above engine unit 20, and ECU (Electronic Control Unit) 10 that controls the operation of the elements and components of motor cycle 100 is located between seat 9 and fuel tank 9a, and engine unit 20. The ECU 10 controls the operation of twin clutch transmission 7 including two friction drive clutches that perform odd-numbered and even-numbered transmission gear (transmission gear mechanism) power transfer respectively, for a single engine.

In the vehicle, transmission 7 is arranged such that the center in the lateral direction of transmission mechanism 700 (see FIG. 3) and the center in the lateral direction of motorcycle 100 are close to each other.

(2) Configuration of Engine Unit 20

(2-1) Rough Configuration of Transmission 7 in Engine Unit 20

FIG. 2 is a schematic diagram provided to explain the configuration of transmission 7 in engine unit 20 in FIG. 1, and, more specifically, a schematic diagram showing the principal portion of an engine unit having the transmission. The engine unit is omitted from FIG. 2.

Transmission 7 shown in FIG. 2 is connected to crankshaft 60 of engine 6, and includes transmission mechanism 700 that varies the rotation speed of rotation power transferred from crankshaft 60 and transfers rotation power to the rear wheel 12 side, and shift mechanism 701 that performs variable operation in transmission mechanism 700.

Transmission mechanism 700 includes first main shaft 71, second main shaft 72, and drive shaft (output shaft) 73, arranged parallel or substantially parallel to crankshaft 60 arranged approximately horizontally in a direction perpendicular to the front-back direction of the vehicle, first clutch 74, second clutch 75, gears 81 through 86, 711, 712, 721, 722, 731, and 732 that perform power transfer between shafts 71 through 73, middle gear 76, first and second clutch actuators 77 and 78, transmission shaft 79, transmission gear 791, output gear 793 and so forth.

In transmission mechanism 700, output transferred to first and second main shafts 71 and 72 is transferred to drive shaft 73 arranged toward the rear by selecting gears 81 through 86, 711, 712, 721, 722, 731, and 732 as appropriate.

Middle gear 76 is fixed to one end (the left end) of drive shaft 73, and the middle gear 76 meshes with transmission gear 791 of transmission shaft 79 (see FIG. 5) that is parallel or substantially parallel to drive shaft 73. Output gear 793 that rotates as a result of the rotation of transmission shaft 79 is fixed to transmission shaft 79.

The transmitting portion of the driving force output to rear wheel 12 via odd-numbered transmission gears (gears 81, 83, 85, 711, 712, and 731) on first main shaft 71, and the transmitting portion of the driving force output to rear wheel 12 via even-numbered transmission gears (gears 82, 84, 86, 721, 722, and 732) on second main shaft 72, have approximately the same outer diameter.

Also, the driving force transmitting portion in first main shaft 71 and the driving force transmitting portion in second main shaft 72 are arranged so as not to overlap concentrically. In this transmission mechanism 700, first main shaft 71 and second main shaft 72 having the same outer diameter are arranged side by side laterally on the same axis line, and rotate independently of each other.

First main shaft 71 and second main shaft 72 preferably are laterally separated on the same axis line, but this is not required. That is, first main shaft 71 and second main shaft 72 may be arranged in any manner as long as the two are of different systems so that transmission paths of the torque of crankshaft 60 input via first clutch 74 and second clutch 75, respectively, do not overlap on the same axis line. In other words, first and second main shafts 71 and 72 may be arranged in any manner as long as the configuration is such that torque of crankshaft 60 is input from a plurality of input channels, and components that transfer power output via drive shaft 73 do not overlap coaxially. For example, a configuration may be used in which mutually facing front ends of first main shaft 71 and second main shaft 72 positioned on the same axis line overlap in a rotatable fashion.

First main shaft 71 is coupled to first clutch 74, and second main shaft 72 is coupled to second clutch 75. First clutch 74 and second clutch 75 are arranged in the vehicle at a distance from each other in a direction (here, the lateral direction) perpendicular to the front-back direction of the vehicle.

First clutch 74 has its operation controlled by ECU 10 via first clutch actuator 77, and performs power transfer of odd-numbered gears including a group of odd-numbered gears (first gear 81, third gear 83, and fifth gear 85). Second clutch 75 has its operation controlled by ECU 10 via second clutch actuator 78, and performs power transfer of even-numbered gears including a group of even-numbered gears (second gear 82, fourth gear 84, and sixth gear 86).

Gear shifting performed for gears 81 through 86, 711, 712, 721, 722, 731, and 732 in transmission mechanism 700 is performed by shift forks 141 through 144 that are movable by the rotation of shift cam 14 in shift mechanism 701. Gear shifting of transmission gears in transmission mechanism 700 is performed by an operation of shift mechanism 701 controlled by ECU 10 together with transmission mechanism 700.

Figure 3:
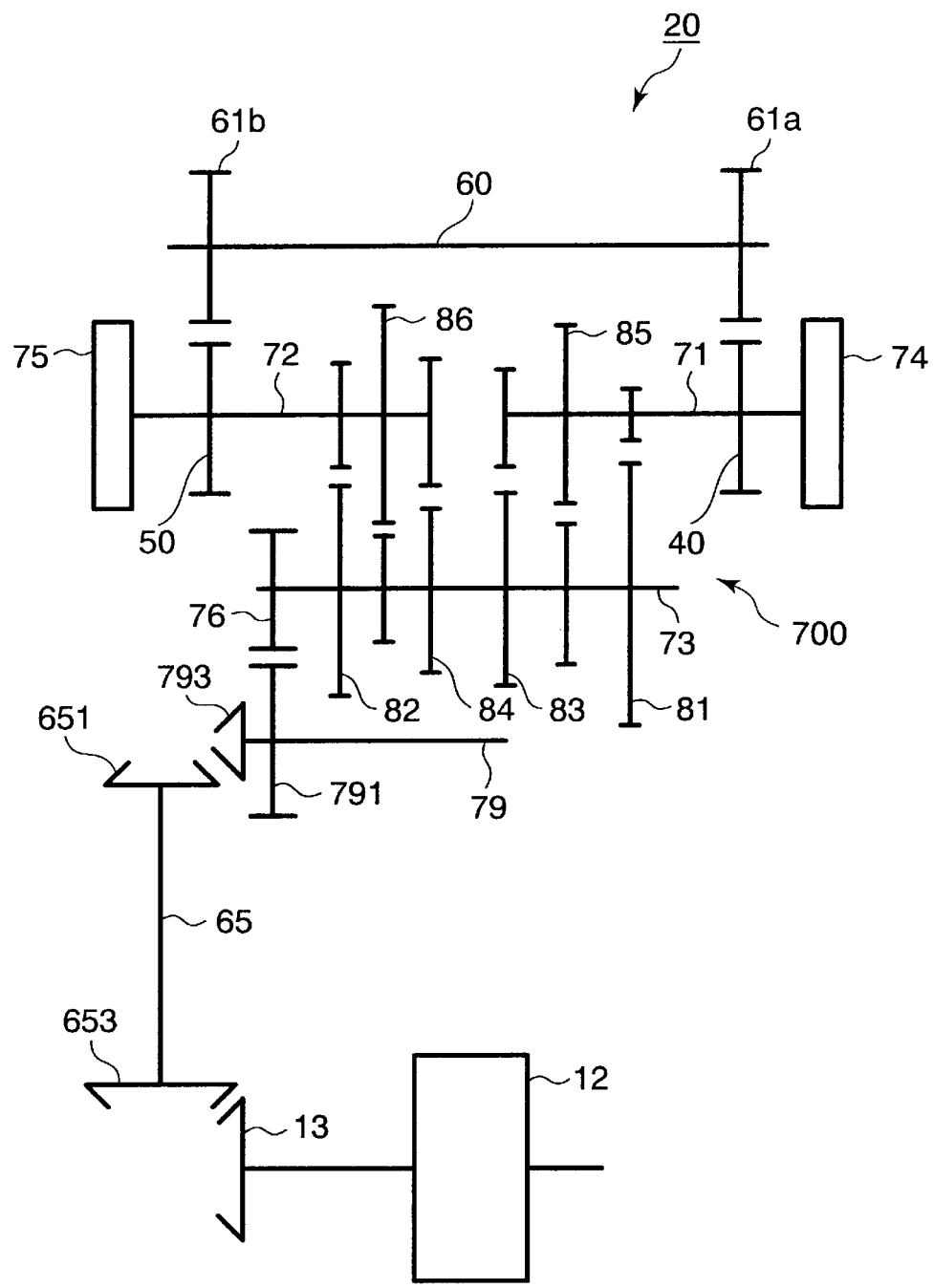
FIG. 3 is a schematic diagram showing the transmission path of driving power via the engine unit.

FIG. 3 is a schematic diagram showing the transmission path of driving power via engine unit 20.

As shown in FIG. 3, the driving force of engine 6 from crankshaft 60 in vehicle 100 is transmitted to transmission shaft 79 from two independent systems including first and second clutches 74, 75 and first main shaft 71 and second main shaft 72 via drive shaft 73.

Bevel gear 651 of propeller shaft 65 arranged perpendicular or substantially perpendicular to transmission shaft 79 meshes with output gear (bevel gear) 793 of transmission shaft 79. Bevel gear 653 that meshes with driven gear 13 that rotates together with rear wheel 12 is fixed to this propeller shaft 65. In this configuration, the driving force of the engine transmitted to transmission shaft 79 in engine unit 20 is transmitted to rear wheel 12 via propeller shaft 65.

(2-2) Drive Unit Case 920 Provided with Transmission

Figure 4:
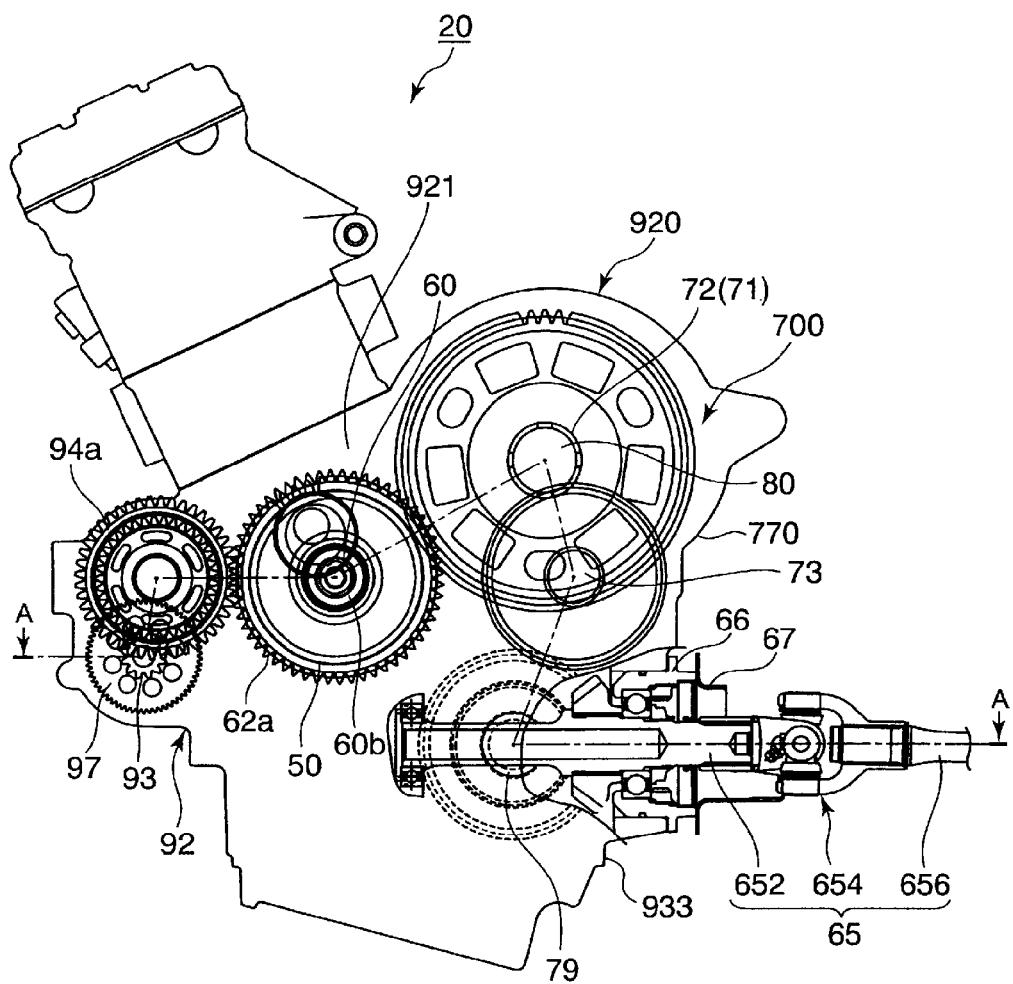
FIG. 4 is a diagram to explain the transmission shown in FIG. 1.
Figure 5:
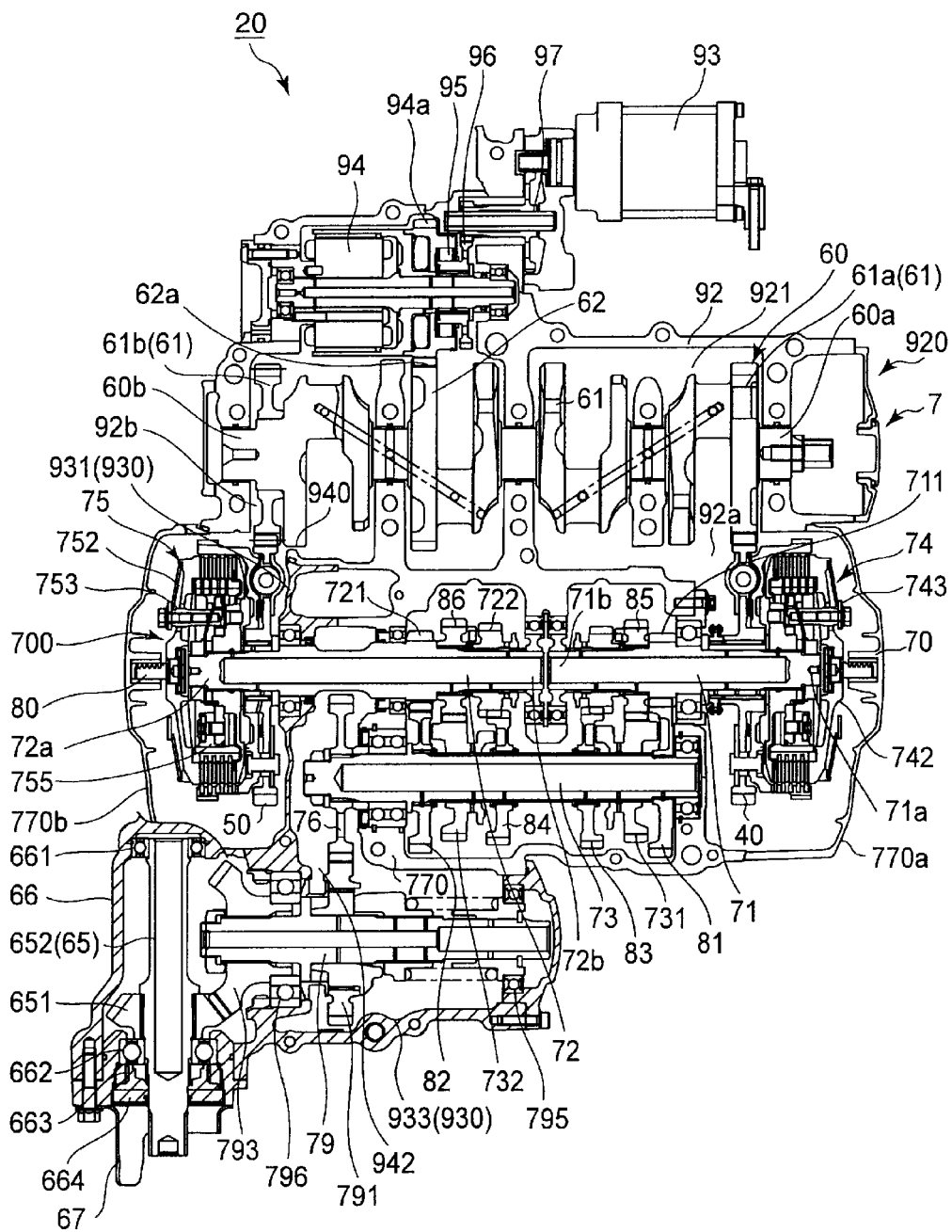
FIG. 5 is a sectional view of the A-A arrow portion of FIG. 4.

FIG. 4 and FIG. 5 are drawings provided to explain the transmission mechanism of the transmission shown in FIG. 1. FIG. 4 is a schematic side view of the principal portion of the engine unit showing the positional relationship of each shift in the transmission mechanism. FIG. 5 is a sectional view of the A-A arrow portion of FIG. 4 and shows the principal portion of the engine unit provided with the transmission. In FIG. 5, for the sake of convenience, the hatches indicating sections of component members are omitted.

As shown in FIG. 4 and FIG. 5, transmission mechanism 700 of transmission 7 is located in an area that is adjacent to crankshaft accommodating section 921 in which crankshaft 60 is arranged facing laterally in crank case 92 of engine unit 20 and includes mission case 770 extending along the longitudinal direction of crankshaft accommodating section 921.

Mission case 770 is parallel or substantially parallel to the direction in which crankshaft accommodating section 921 extends in crank case 92. Mission case 770 accommodates portions of first and second main shafts 71 and 72, drive shaft 73, and gears 81 through 86, 711, 712, 721, 722, 731, and 732.

Mission case 770 defines engine unit chassis (drive unit case) 920 together with crankshaft accommodating section 921 and crank case 92.

Clutch cover (side cover section) 770a, bell housing 930, clutch cover (side cover section) 770b, and propeller shaft case 66 are attached to this drive unit case 920. For convenience, bell housing 930 and propeller shaft case 66 are shown as hatched in FIG. 5.

Clutch cover 770a is attached detachably to one side surface (the right side surface) of mission case 770 in drive unit case 920, and covers first clutch 74 from one side (the right side).

Bell housing 930 is attached detachably to mission case 770 from the other side (the left side surface) of mission case 770.

Bell housing 930 includes planar bell housing body 931 and transmission shaft accommodating section 933 that is preferably integral with bell housing body 931.

Bell housing body 931 is attached to the other side (the left side surface) of mission case 770 and covers second main shaft 72 and drive shaft 73 in mission case 770 sideways.

Transmission shaft accommodating section 933 is attached to mission case 770 so as to cover a connecting portion of drive shaft 73 and transmission shaft 79 and rotatably accommodating transmission shaft 79.

Specifically, transmission shaft accommodating section 933 is detachably attached to the back end surface of mission case 770 covering drive shaft 73 so as to surround the transmission shaft 79.

The right side end surface of transmission shaft accommodating section 933 is open, and output gear (bevel gear) 793 fixed to an end (the left side end) of transmission shaft 79 via this opening meshes with bevel gear 651 of propeller shaft 65. Furthermore, this opening is covered by propeller shaft case 66 that accommodates propeller shaft 65. In propeller shaft case 66, adjustable joint cover 67 that covers adjustable joint portion 654 (see FIG. 4) in propeller shaft 65 is installed consecutively.

Clutch covers 770a and 770b each preferably have a bell shape, and cover first clutch 74 and second clutch 75 from both sides (the left and right sides) of crank case 92.

Of clutch covers 770a and 770b, one (right side) clutch cover 770a is attached detachably to one side surface (here, the right side surface) of mission case 770, and together with this one side surface, defines a clutch case that accommodates first clutch 74.

Clutch cover 770b is provided detachably in the other side surface (the left side surface) of bell housing body 931 so as to cover bell housing body 931, and covers second clutch 75 from the other side (the left side).

Also, clutch cover 770b, together with bell housing 930 attached detachably to the other side surface (the left side surface) of mission case 770, defines a clutch case (casing material) that accommodates second clutch 75.

Transmission mechanism 700 of transmission 7 will now be described in detail.

(2-3) Transmission Mechanism 700 of Transmission 7 in Drive Unit Case 20

Starter motor 93 is attached to crank case 92 of drive unit case 920, and idler gear 97 and starter gear 96 are driven by this starter motor 93.

Gear 94a is connected to starter gear 96 via one-way clutch section 95. The gear 94a meshes with gear 62a provided in crank web 62 of crankshaft 60. As a result, when starter motor 93 drives, gear 94a rotates integrally with starter gear 96 via one-way clutch section 95, and rotates crankshaft 60.

Generator 94 is attached to crank case 92, and this generator 94 rotates integrally with gear 94a. As stated above, gear 94a is connected to gear 62a provided on crank web 62 of crankshaft 60. Thus, generator 94 is driven when crankshaft 60 rotates.

As shown in FIG. 2 and FIG. 5, crankshaft 60 of engine 6 (FIG. 1) includes a plurality of crank webs 61 and 62. As shown in FIG. 5, crankshaft 60 is located inside crankshaft accommodating section 921 of crank case 92 in such a way that the center portion in the direction of extension is approximately in the center in the vehicle width direction.

Of the plurality of crank webs 61 in crankshaft 60, crank webs 61a and 61b located at one end and the other end of crankshaft 60 are external gears on which gear grooves are provided on the outer periphery. These crank webs 61a and 61b are located at positions facing the inside of both clutch cases (clutch covers 770a and 770b) from openings 92a and 92b that open on the first clutch 71 and second clutch 72 sides (here, rearward) on both sides (both sides axially) of crank case 92 in crankshaft accommodating section 921.

Crank web 61a provided at one end (the right end) in crankshaft 60 meshes with first primary driven gear (also referred to as "first input gear") 40 in first clutch 74 inside crankshaft accommodating section 921. Through this meshing, power transferred to first input gear 40 from crank web 61a at one end of crankshaft 60 is transferred to first main shaft 71 of transmission 7 from one end of crankshaft 60 via first clutch 71.

On the other hand, crank web 61b provided at the other end (the left end) in crankshaft 60 meshes with second primary driven gear (also referred to as "second input gear") 50 in second clutch 75 inside the clutch case. Through this meshing, power transferred to second input gear 50 from crank web 61b at the other end of crankshaft 60 is transferred to second main shaft 72 from the other end of crankshaft 60.

A meshing portion between gear grooves of crank web 61b and second input gear 50 is located in a communicating portion that communicates inside the clutch case at the other end (the left end) of crankshaft accommodating section 921 in engine unit case 920. The communicating portion is defined by opening 92b at the other end of crankshaft accommodating section 921 and through hole 940 located in a junction section of bell housing body 931 defining the clutch case.

That is to say, through hole 940 is located in a junction section between bell housing body 931 (partition member) and drive unit case 920 through the junction section. In through hole 940, there is a power transmitting portion in which crank web 61b and second input gear 50 mesh with each other and which transfers rotation power from the crankshaft 60 side to second main shaft 72.

First clutch 74 and second clutch 75 are arranged rearward of crankshaft 60 (see FIGS. 4 and 5), and opposite two ends 60a and 60b, respectively, of crankshaft 60 (see FIGS. 2 and 5). Base end 71a of first main shaft 71 is coupled to first clutch 74, and base end 72a of second main shaft 72 is coupled to second clutch 75. First clutch 74 and second clutch 75 will be described in detail later.

First main shaft 71 and second main shaft 72 extend in mutually opposite directions from first clutch 74 and second clutch 75, and are arranged in a direction (here, a lateral direction) intersecting the front-back direction of motorcycle 100 approximately at a right angle.

First and second main shafts 71 and 72 are arranged so as to position the end surface portions of mutually opposite front ends 71b and 72b approximately in the center in the vehicle width direction of motorcycle 100 in drive unit case 920 of the engine unit.

Specifically, the front end (other end) 71b side of first main shaft 71 and the front end (other end) 72b side of second main shaft 72 are inserted into hollow mission case 770 connected to crank case 92 of the engine unit.

Here, first main shaft 71 and second main shaft 72 are arranged with the respective base end (one end) 71a/72a sides projecting left and right from both sides of mission case 770.

Figure 6:
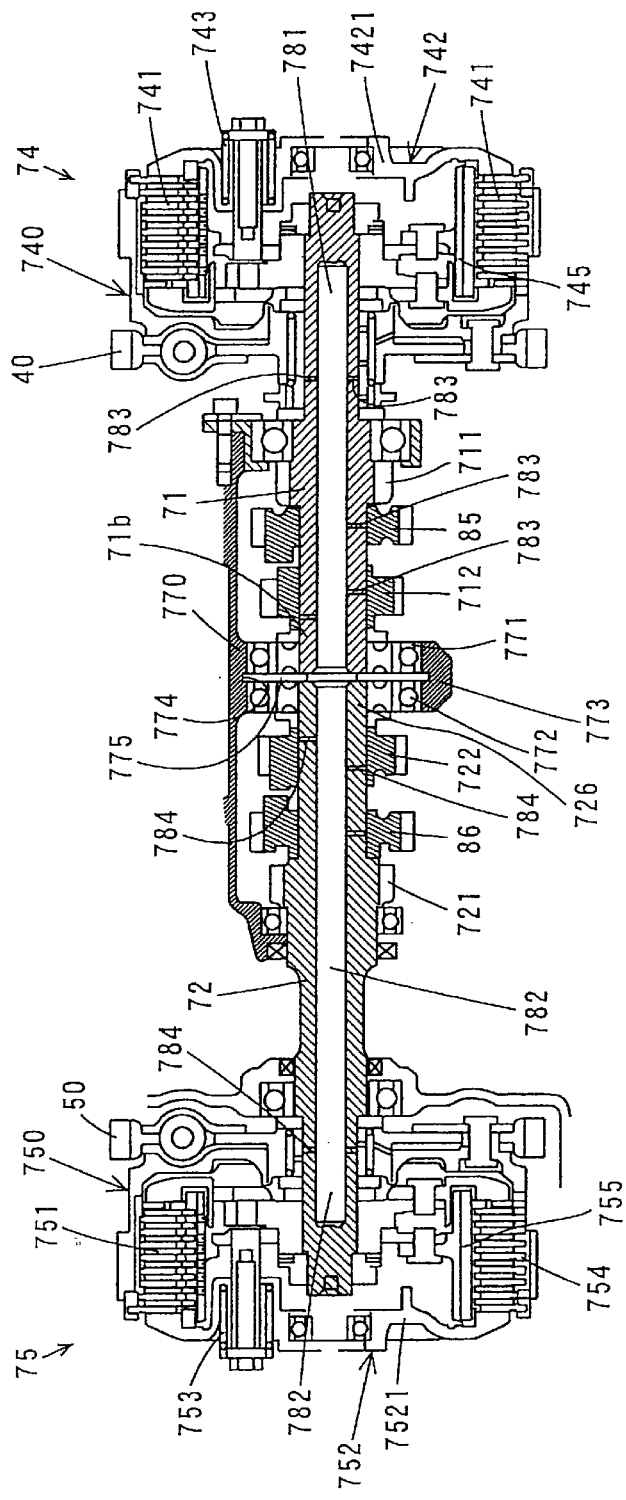
FIG. 6 is a principal portion cross-sectional view showing first and second clutches and first and second main shafts.

FIG. 6 is a principal portion cross-sectional view showing first and second clutches 74 and 75 and first and second main shafts 71 and 72.

As shown in FIG. 6, on the same axis line, mutually facing first main shaft 71 front end 71b and second main shaft 72 front end 72b are inserted into bearings 771 and 772 inside mission case 770, and are pivoted rotatably. These bearings 771 and 772 fit inside an opening in flange 773 that rises from the inner peripheral surface of mission case 770.

Flange 773 rotatably supports the end surfaces of front ends 71b and 72b of first main shaft 71 and second main shaft 72 via bearings 771 and 772 so as to face each other in the center portion of the flange 773.

Front ends 71b and 72b of first main shaft 71 and second main shaft 72 preferably are pivoted rotatably in crank case 92 by being inserted into bearings 771 and 772 inside flange 773 inside mission case 770, but this is not required. For example, a configuration will be assumed in which only one or other of front ends 71b and 72b of hollow first main shaft 71 and second main shaft 72 is received by a bearing inside a flange provided inside mission case 770. And with this configuration, a configuration will be assumed in which a needle bearing is attached to the inner periphery of one or other of front ends 71b and 72b, and the other one of front ends 71b and 72b is inserted into this needle bearing.

That is to say, the other of the adjacent ends is inserted rotatably into one end in coaxially aligned first main shaft 71 and second main shaft 72, and the one end only is supported in flange 773 rising from that mission case 770 via a bearing. To summarize, of two main shafts arranged on the same axis, an end of one main shaft is inserted into an end of the other main shaft, and only that end of the one main shaft is supported rotatably inside mission case 770. According to this configuration, if both main shafts are hollow and the respective hollow portions are lubricating oil channels, lubricating oil can flow satisfactorily inside both main shafts simply by providing an inflow of lubricating oil at an end at which the two main shafts overlap, or a point near that end.

As shown in FIG. 6, first main shaft 71 and second main shaft 72 have internal cavities 781 and 782, respectively, that extend in the axial direction and open at one end. In this case, cavity 781 opens at the front end of first main shaft 71, and cavity 782 opens at one end (here, the front end) of second main shaft 72.

Also, a plurality of through holes 783 communicating between cavity 781 and the exterior of first main shaft 71 are provided in first main shaft 71, and a plurality of through holes 784 communicating between cavity 782 and the exterior of second main shaft 72 are provided in second main shaft 72.

Flange 773 located inside mission case 770 includes ring-shaped groove 774 in the center portion in the axial direction in the inner peripheral surface of the opening, fitting inside bearings 771 and 772. Also, lubricating oil supply path 775 is arranged in flange 773 so as to communicate with groove 774.

Lubricating oil supply path 775 is connected to a lubricating oil supply source (not shown). With this kind of configuration, lubricating oil supplied to lubricating oil supply path 775 from the lubricating oil supply source is supplied to the space inside flange 773 from one end of lubricating oil supply path 775.

Lubricating oil supplied inside flange 773 flows from one end of first main shaft 71 and one end of second main shaft 72, into cavity 781 and cavity 782. Lubricating oil that has flowed into cavity 781 is supplied to the interior of first clutch 74 and the outer periphery of first main shaft 71 via plurality of through holes 783. As a result, a rise in temperature of first clutch 74 is prevented, and fixed gear 711, fifth gear 85, and spline gear 712 are lubricated. Also, lubricating oil that has flowed into cavity 782 is supplied to the interior of second clutch 75 and the outer periphery of second main shaft 72 via plurality of through holes 784. As a result, a rise in temperature of second clutch 75 is prevented, and spline gear 722, sixth gear 86, and fixed gear 721 are lubricated.

In engine unit 20, of the ends of first and second main shafts 71 and 72 located on the same axis line in this way, first clutch 74 and second clutch 75 are provided at ends (base ends) 71a and 72a on the sides farthest from each other in a lateral direction.

These first and second clutches 74 and 75 are connected outwardly from the axis to base end (one end) 71a and base end (one end) 72a of first and second main shafts 71 and 72 projecting axially outward from both side surfaces of mission case 770, as shown in FIG. 5 and FIG. 6.

Base end 72a of second main shaft 72 projects farther axially outward than the other side surface of mission case 770 and bell housing body 931 attached detachably to the other side surface, and is positioned farther axially outward than the same-side (left-side) end of adjacent drive shaft 73, as shown in FIG. 5.

First clutch 74 is located farther axially outward than one side surface of mission case 770, and is covered by clutch cover 770a attached detachably to one side surface (one side surface in a direction approximately perpendicular to the horizontal with respect to the vehicle center axis).

Second clutch 75 is located farther axially outward than the other side surface of mission case 770 and bell housing body 931 attached detachably to the other side surface, and is covered, axially from the outside, by clutch cover 770b.

Second clutch 75 is connected detachably to base end 72a of second main shaft 72 at a position overlapping portion of middle gear 76 axially sideways (on the left side) of drive shaft 73.

Between this second clutch 75 and middle gear 76 at a distance therefrom in the axial direction is located bell housing body 931 (partition member) that is part of the clutch case accommodating second clutch 75 and separates second clutch 75 and middle gear 76.

That is to say, the clutch case that is defined by clutch cover 770b and bell housing body 931 and accommodates second clutch 75 and an accommodating area of drive shaft 73 to which middle gear 76 is fixed are separated by bell housing body 931.

Via communicating portion 942 that is provided on the back end side of mission case 770 and causes mission case 770 and transmission shaft accommodating section 933 to communicate with each other, drive shaft 73 meshes with transmission gear 791 of transmission shaft 79 via middle gear 76.

Transmission shaft 79 is arranged rotatably in transmission shaft accommodating section 933 that opens at the left end via bearing areas 795, 796. The left end of transmission shaft 79 protruding from the left end of transmission shaft accommodating section 933 is provided in propeller shaft case 66. Output gear 793 provided at the left end of transmission shaft 79 meshes with bevel gear 651 fixed to first shaft 652 of propeller shaft 65 in propeller shaft case 66.

Output gear 793 is arranged in a position aligned with second clutch 75 and is arranged in a position in the close vicinity of the clutch case of second clutch 75 when propeller shaft case 66, together with propeller shaft 65, is removed from mission case 770.

First shaft 652 is provided in propeller shaft case 66 facing the front-back direction of the vehicle, and an end thereof on the front side of the vehicle is attached rotatably via bearing 661. Furthermore, an end of first shaft 652 on the rear side of the vehicle protrudes from propeller shaft case 66 to the rear of the vehicle via bearing 662, bearing keep 663 and oil seal 663.

The protruding portion is coupled to second shaft 656 inside adjustable joint cover 67 via adjustable joint section (see FIG. 4) 654. Second shaft 656 is provided with bevel gear 653 (see FIG. 3) that meshes with driven gear 13 on the rear wheel 12 side. With this configuration, in a direction perpendicular to transmission shaft 79, power is taken out from the engine and transmitted to rear wheel 12, In FIG. 5, adjustable joint section 654 (see FIG. 4) and second shaft 656 (see FIG. 4) are omitted.

First and second clutches 74, 75 shown in FIG. 2 through FIG. 6 are of the same configuration and use the same multi-plate type clutch.

In first clutch 74, as shown in FIG. 6, first pressure plate 7421 of pressure plate 742 is biased toward first input gear 40 by clutch spring 743. As a result, a state normally exists in which plurality of clutch plates 741 and plurality of friction plates 744 are in mutual contact, and the torque of crankshaft 60 (see FIG. 2) is transferred to first main shaft 71 via first input gear 40, clutch housing 740, and center hub 745.

In second clutch 75, first pressure plate 7521 of pressure plate 752 is biased toward second input gear 50 by clutch spring 753. As a result, a state normally exists in which plurality of clutch plates 751 and plurality of friction plates 754 are in mutual contact, and the torque of crankshaft 60 (see FIG. 2) is transferred to second main shaft 72 via second input gear 50, clutch housing 750, and center hub 755.

Also, as shown in FIG. 2, first clutch actuator 77 is coupled to first clutch 74 via first pullrod 70. And second clutch actuator 78 is coupled to second clutch 75 via second pullrod 80.

First pullrod 70 is coupled to pressure plate 742 of first clutch 74 (see FIG. 5 and FIG. 6), and second pullrod 80 is coupled to pressure plate 752 of second clutch 75 (see FIG. 5 and FIG. 6).

First clutch actuator 77 shown in FIG. 2 has, for example, a link (not shown) that pulls first pullrod 70 toward the first clutch actuator 77 side, a hydraulic cylinder (not shown) that operates the link, a motor (not shown) that generates hydraulic pressure in the hydraulic cylinder, and so forth. Second clutch actuator 78 preferably includes the same kind of configuration as first clutch actuator 77.

In the present preferred embodiment, first pressure plate 7421 in pressure plate 742 (see FIG. 5 and FIG. 6) is pulled toward first clutch actuator 77 due to the fact that first pullrod 70 is pulled toward first clutch actuator 77 by first clutch actuator 77. As a result, a plurality of clutch plates 741 and a plurality of friction plates 744 (see FIG. 6) are separated from each other, and the transfer of torque from first input gear 40 to first main shaft 71 is disconnected.

Also, first pressure plate 7521 of pressure plate 752 (see FIG. 5 and FIG. 6) is pulled toward second clutch actuator 78 due to the fact that second pullrod 80 is pulled toward second clutch actuator 78 by second clutch actuator 78. As a result, a plurality of clutch plates 751 and a plurality of friction plates 754 (see FIG. 6) are separated from each other, and the transfer of torque from second input gear 50 to second main shaft 72 is disconnected.

Thus, in normal operation, first and second clutches 74 and 75 come to a state in which crankshaft 60 is connected to first main shaft 71 and second main shaft 72, respectively, that is, torque is transferred to first main shaft 71 and second main shaft 72. On the other hand, when first clutch actuator 77 and second clutch actuator 78 are driven, first clutch 74 and second clutch 75 come to a state in which torque to first main shaft 71 and second main shaft 72 is disconnected.

These first and second clutches 74 and 75 each include a back torque limiter that limits the application of torque in first and second main shafts 71 and 72 in a direction opposite to the forward direction (the direction in which the engine drives so as to accelerate the vehicle) that is the direction in which rotation is performed in accordance with the rotation of crankshaft 60 by engine drive. Specifically, first clutch 74 includes a back torque limiter that limits back torque applied to first main shaft 71, and second clutch 75 includes a back torque limiter that limits back torque applied to second main shaft 72.

The configuration of the clutches (first clutch 74 and second clutch 75) includes a back torque limiter will now be described in detail.

Each of first clutch 74 and second clutch 75 is a multi-plate clutch configured in the same way and hence have the same basic configuration of the same mirror-symmetric structure. Thus, second clutch 75 also includes a back torque limiter having the same basic configuration as that of first clutch 74, but with a mirror-symmetric structure. Therefore, only the configuration of first clutch 74 is described below, and a description of the configuration of second clutch 75 is omitted.

Figure 7:
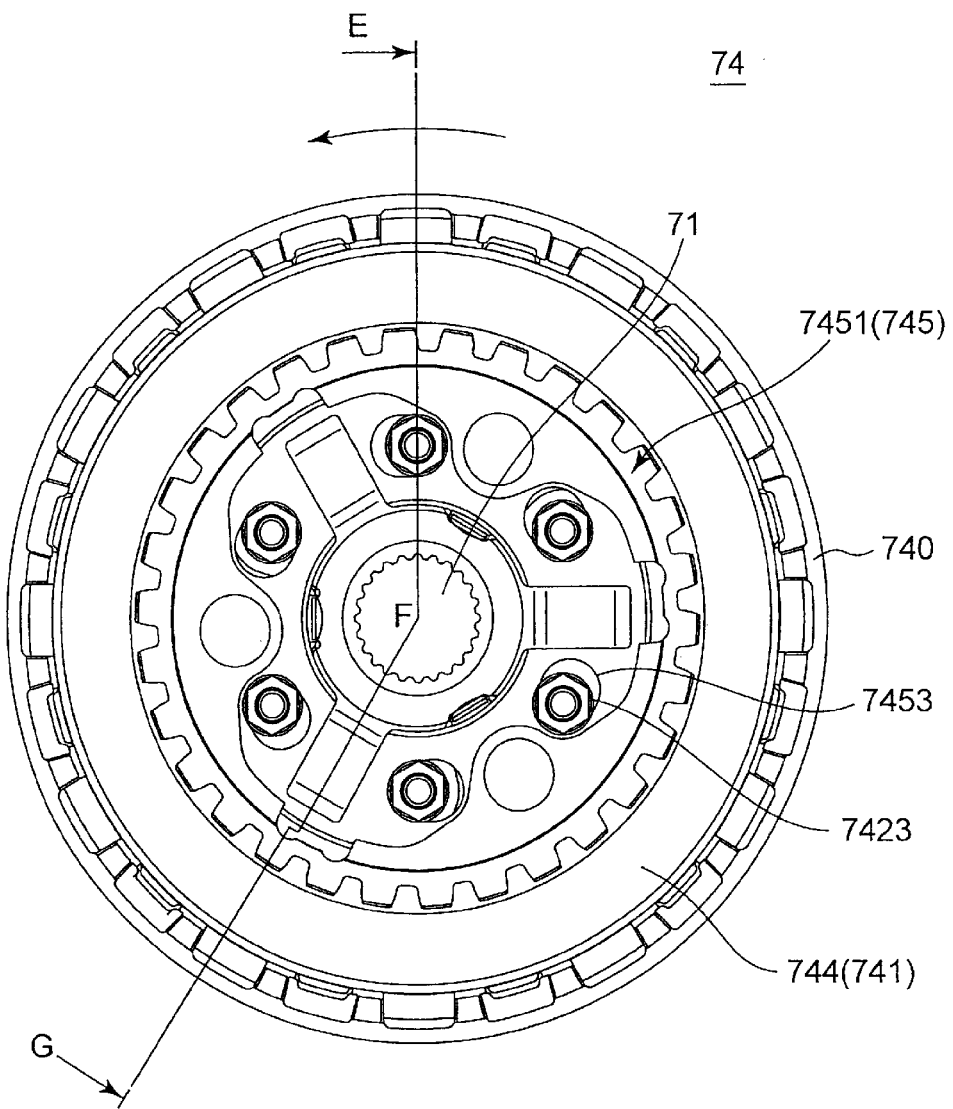
FIG. 7 is an exploded perspective view showing the first clutch in the transmission shown in FIG. 5 as viewed from the right side.
Figure 8:
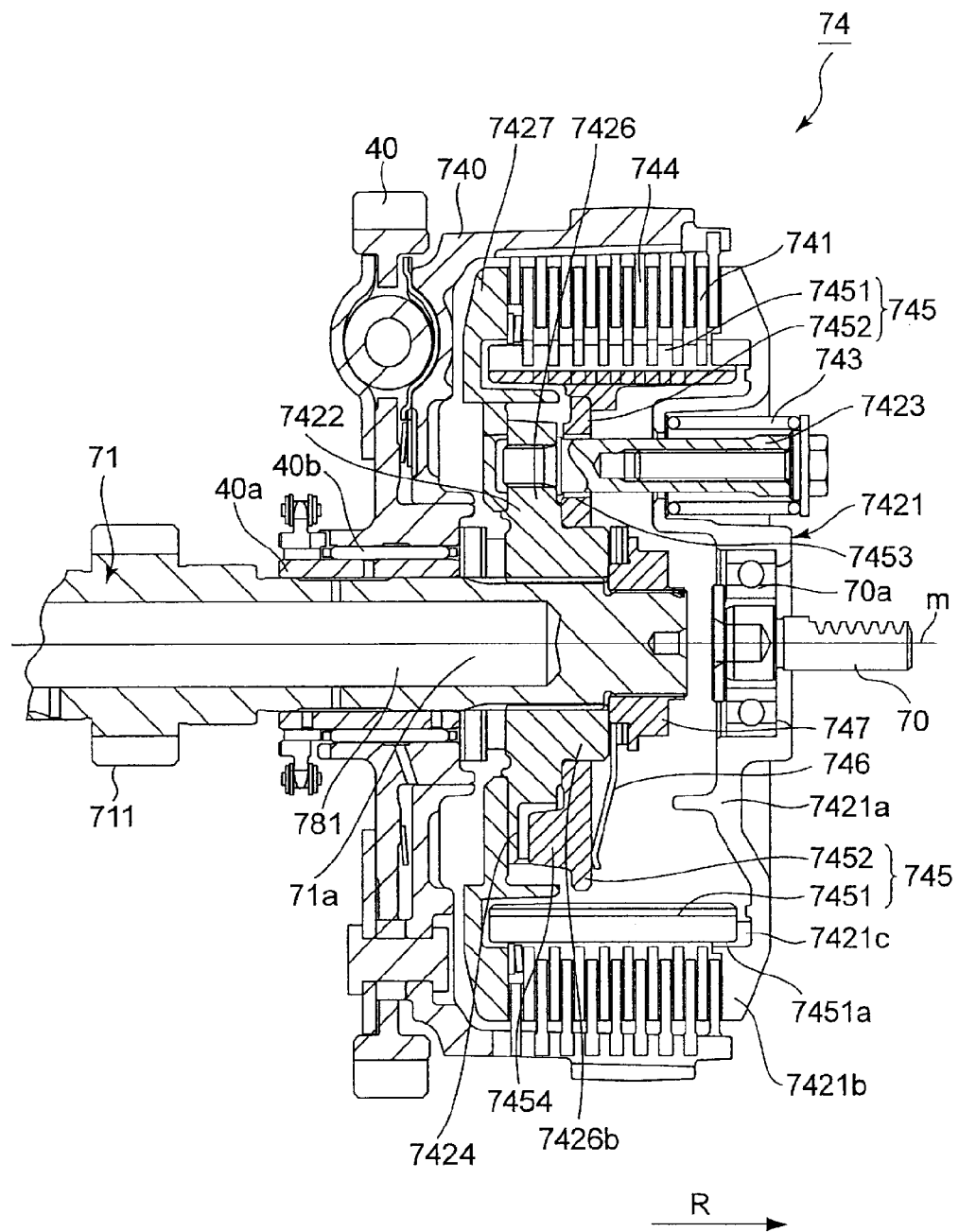
FIG. 8 is an E-F-G-line principal portion partial cross-sectional view of the first clutch shown in FIG. 7.
Figure 9:
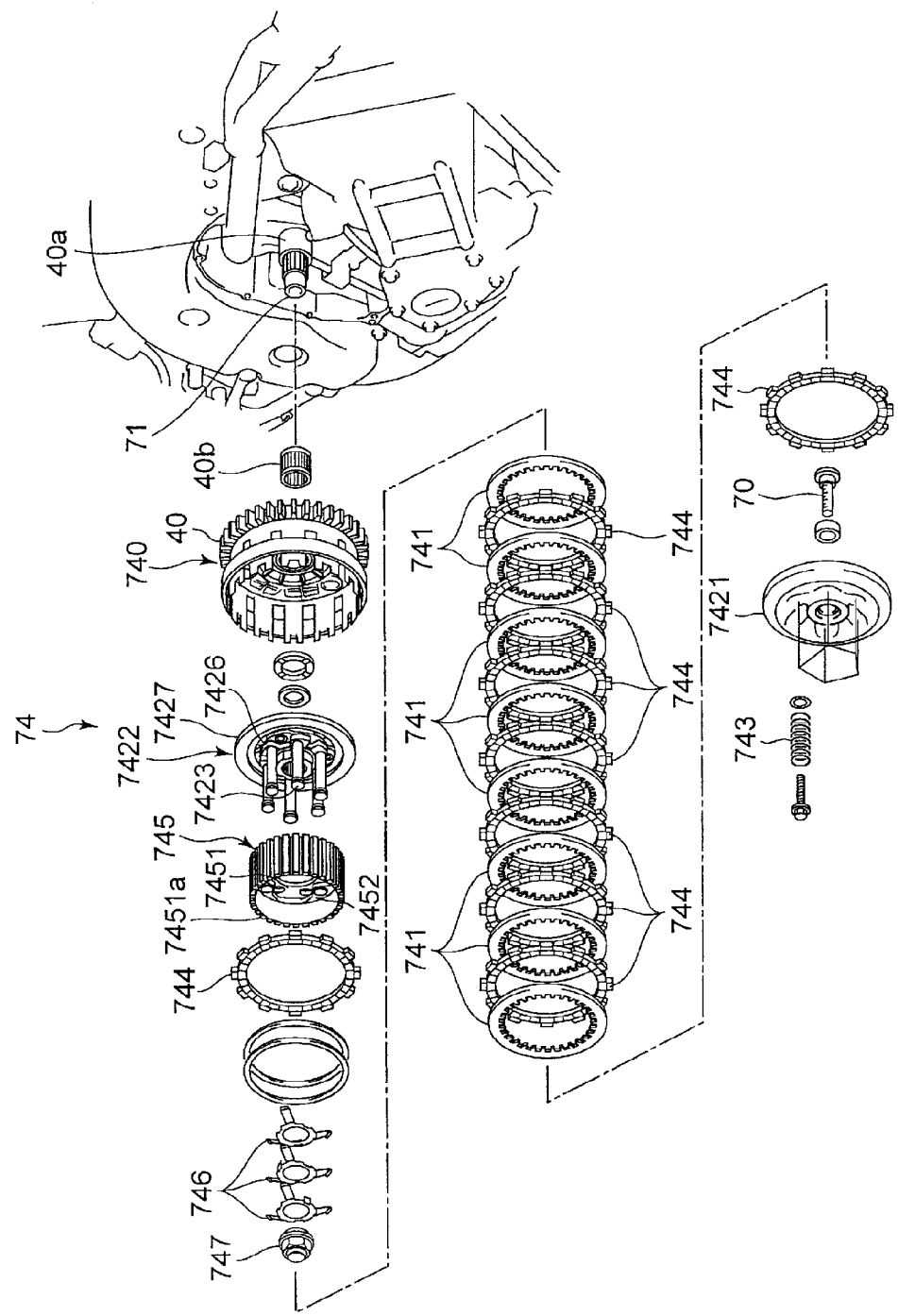
FIG. 9 is an exploded perspective view of the principal portion configuration of the first clutch shown in FIG. 8.

FIG. 7 is a drawing showing a state in which clutch spring 743 and pressure plate 742 have been removed from first clutch 74 in transmission 7 shown in FIG. 5, viewed from the right side, and FIG. 8 is a partial cross-sectional view through line E-F-G of the first clutch shown in FIG. 7. FIG. 9 is an exploded perspective view showing the principal portion configuration of the first clutch shown in FIG. 8. In the case of first clutch 74 shown in FIG. 8, a principal portion cross-section of different portions above and below rotation center m is shown.

As shown in FIG. 8 and FIG. 9, first input gear 40 that transfers torque of crankshaft 60 to first clutch 74 is fitted over externally fitted collar 40a and needle bearing 40b fitted around collar 40a, on other end (base end) 71a of first main shaft 71. As a result, first input gear 40 becomes rotatable on first main shaft 71.

On this first input gear 40, clutch housing 740 preferably is integrally arranged so as to be rotatable together with first input gear 40.

Clutch housing 740 preferably has a bottomed cylindrical shape, and is attached integrally to a hub portion of input gear 40 fitted externally in a rotatable fashion on an end (base end 71a) of first main shaft 71, with first main shaft 71 inserted through the center of that bottom portion and the inside opened at one end. Thus, clutch housing 740 is rotatably attached coaxially with first main shaft 71 together with first input gear 40 to the outer periphery of an end (base end 71a) of first main shaft 71 together with first input gear 40.

Furthermore, on the inside of clutch housing 740 are provided annular friction plate 744 and annular clutch plate 741, arranged alternately and mutually separably in the axial direction, center hub 745 provided inside friction plates 744 and clutch plates 741, and second pressure plate 7422 sandwiching friction plates 744 and clutch plates 741 together with first pressure plate 7421.

Center hub 745 and second pressure plate 7422 define a clutch hub section provided inside clutch housing 740.

Annular friction plates 744 are arranged so as to be coaxial with first main shaft 71, and outer diameter splines provided on the outer periphery are meshed with inner diameter splines provided on the inner peripheral surface of clutch housing 740. As a result, friction plates 744 become rotatable about the axial center of first main shaft 71 together with clutch housing 740.

The plurality of annular clutch plates 741 located between these friction plates 744 are meshed with center hub 745 located inside plurality of clutch plates 741 via the inner diameter splines provided on the inner periphery. As a result, clutch plates 741 rotate together with center hub 745.

As shown in FIG. 8, center hub 745 is arranged, separably in the axial direction, adjacent to second pressure plate 7422 attached in a flange shape extending radially outward from first main shaft 71 projecting inside clutch housing 740.

Stepped nut (muffler) 747 is attached to an end (to be specific, the base end) of the first main shaft 71 via externally fitted leaf spring 746.

The stepped nut 747 fixes second pressure plate 7422 to an end of first main shaft 71 and prevents its detachment from that first main shaft 71, and also inhibits movement of leaf spring 746 in the axial direction.

Center hub 745 is arranged so as to surround an end of first main shaft 71, and preferably has a bottomed cylindrical shape defined by cylindrical section 7451 on which outer diameter splines are arranged to mesh with inner diameter splines of clutch plates 741 on the outer peripheral surface, and boss section 7452 of a disk shape, provided on press boss section 7426 of second pressure plate 7422. Here, cylindrical section 7451 includes an attachment piece having a rivet hole (not shown) that extends inside the inner wall on one opening side, and boss section 7452 is attached to the back surface of this attachment piece.

Cylindrical section 7451 shown in FIG. 8 is connected movably in the axial direction in a state in which movement in the rotation direction is regulated by being mortised to first pressure plate 7421 at the open end edge of one end. Specifically, outer diameter splines 7451a provided on the outer peripheral surface on the open end edge of cylindrical section 7451 mesh with inner diameter splines 7421c arranged along the axial direction of annular projection 7421b projecting toward second pressure plate 7422 from the outer periphery of body 7421a of first pressure plate 7421, so that movement in the circumferential direction is regulated, and movement in the axial direction is not restricted.

The opening at the other end of this cylindrical section 7451 is closed by boss section 7452, and boss section 7452 is biased toward second pressure plate 7422 by leaf spring 746 from one end of first main shaft 71.

Leaf spring 746 is fixed by stepped nut 747 attached to first main shaft 71 projecting and passing through press boss section 7426 of second pressure plate 7422 inside center hub

745. Inside clutch housing 740, leaf spring 746 presses boss section 7452 (center hub 745) arranged separably in the axial direction with respect to second pressure plate 7422 toward second pressure plate 7422 from the stepped nut 747 side.

Boss section 7452 includes elongated hole 7453 through which stud 7423 rising from second pressure plate 7422 in the axial direction passes movably in the circumferential direction, and convex follower cam 7454 that engages with concave operating cam 7424 provided on second pressure plate 7422 disengageably about the axis. A plurality of elongated holes 7453 and follower cams 7454 are arranged at predetermined intervals in the circumferential direction of boss section 7452.

This boss section 7452 is rotatably fitted over press boss hub section 7426*b* of press boss section 7426 of second pressure plate 7422 attached to an end of first main shaft 71. Also, follower cam 7454 of boss section 7452 in center hub 745 is in an engaged state provided inside operating cam 7424 of press boss section 7426. With boss section 7452 in this state, stud 7423 rising from outer periphery 7426*a* (see FIG. 9) is inserted into an elongated hole so as to be movable by a predetermined distance in the circumferential direction.

In boss section 7452, follower cam 7454 is provided on the surface opposite press boss section 7426 of second pressure plate 7422 (for convenience, referred to as the "opposing surface"), projecting toward the press boss section 7426 side. Follower cam 7454 is arranged on boss section 7452 so as to engage in the rotation direction with the opposing surface abutting operating cam 7424 when rotating in one direction about the axis, and to rotate with the opposing surface separated from operating cam 7424 when rotating in the other direction.

Figure 10A:
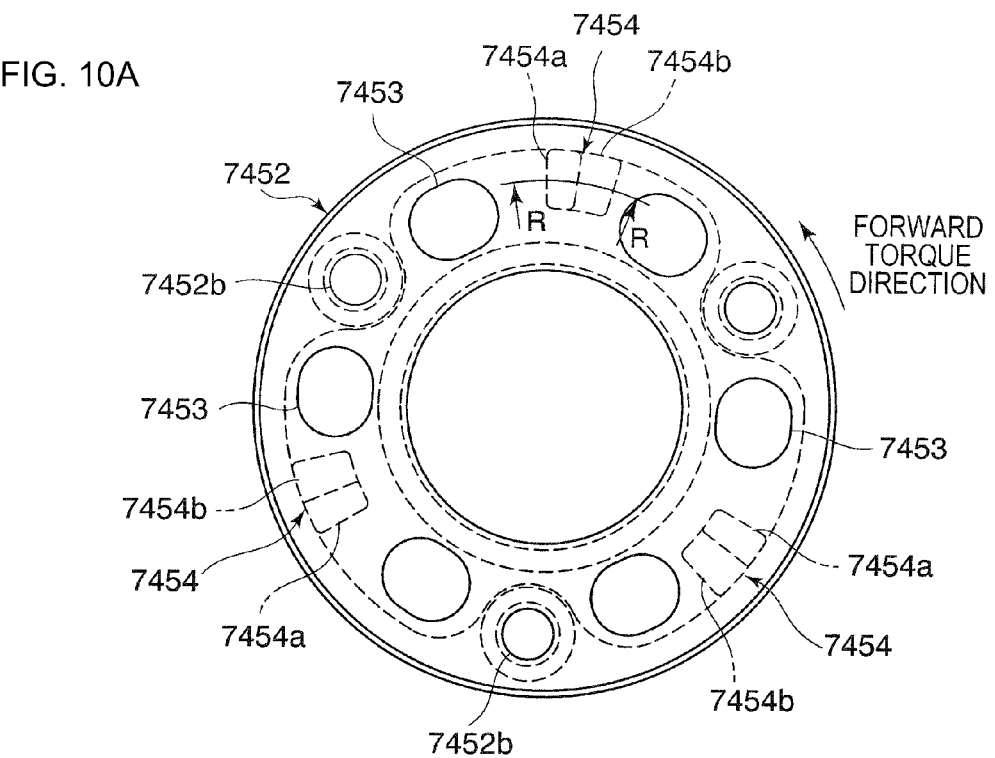
FIGS. 10A and 10B are a diagrams showing a boss section of a center hub provided with a follower cam in the first clutch.
Figure 10B:
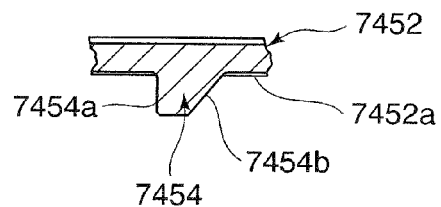

FIG. 10 is a drawing showing boss section 7452 of center hub 745 including follower cam 7454 in first clutch 74, in which FIG. 10A is a drawing of the same boss section 7452 viewed from the opposing surface—that is, from one end of first main shaft 71 (the right side of the vehicle)—and FIG. 10B is a partial cross-sectional view through R-R line in FIG. 10A.

As shown in FIG. 10, follower cam 7454 projects from opposing surface 7452*a* of boss section 7452 suspended inside cylindrical section 7451 in center hub 745. Follower cam 7454 includes contact end surface 7454*a* on the counterclockwise direction side that makes surface contact with operating cam 7424 when output to the rear wheel, which is the driving wheel, by rotation in a counterclockwise direction when viewing the vehicle from the right side, and inclined surface 7454*b* that is inclined toward the clockwise direction side from the projecting end of contact end surface 7454*a*. Here, follower cam 7454 preferably has a right-angled trapezium longitudinal shape, with contact end surface 7454*a* rising perpendicularly with respect to opposing surface 7452*a*, and including inclined surface 7454*b* inclined toward the opposing surface 7452*a* side from the periphery of the projection of that contact end surface 7454*a*.

In boss section 7452 of center hub 745, elongated holes 7453, and rivet holes 7452*b* joined via rivets to rivet holes (not shown) of an attachment piece extending inward from the inner wall of cylindrical section 7451 (see FIG. 8), are arranged at predetermined intervals around the central opening.

As shown in FIG. 8, with respect to follower cam 7454, operating cam (helical cam) 7424 preferably has a concave shape on the opposing surface of press boss section 7426 facing boss section 7452 of center hub 745 on second pressure plate 7422.

Press boss section 7426 preferably is disk-shaped, and defines second pressure plate 7422 via annular flange 7427 attached around the periphery, and a plurality of studs 7423 attached so as to rise from the top of the opposing surface (see FIG. 8 and FIG. 9).

Figure 11A:
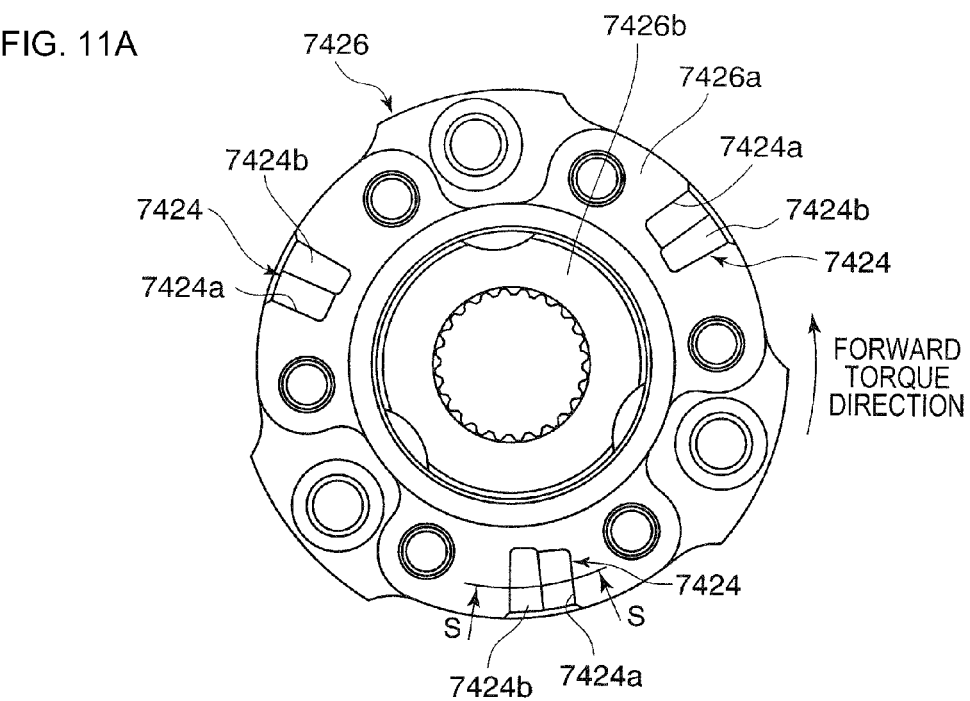
FIGS. 11A and 11B are a diagrams showing a press boss section of a second pressure plate in the first clutch.
Figure 11B:
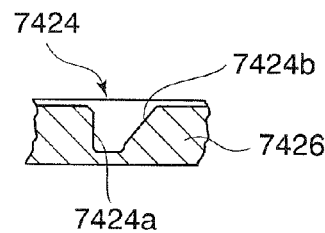

FIG. 11 is a drawing showing press boss section 7426 of second pressure plate 7422 in first clutch 74, in which FIG. 11A is a front view of press boss section 7426 from the opposing surface side—that is, one end of first main shaft 71 (the right side of the vehicle)—and FIG. 11B is a partial cross-sectional view through line S-S in FIG. 11A.

Press boss section 7426 shown in FIG. 11 preferably is disk-shaped, and is joined by spline coupling to base end 71*a* of first main shaft 71 inserted into an opening provided in the center, and rotates integrally and coaxially with first main shaft 71.

Press boss section 7426 includes press boss hub section 7426*b* projecting toward the boss section 7452 side in the center portion around the opening in which first main shaft 71 is inserted in disk-shaped outer periphery 7426*a* including an opposing surface facing boss section 7452 of center hub 745.

Boss section 7452 of center hub 745 is fitted over press boss hub section 7426*b* so as to be movable in the axial direction and in the circumferential direction, and is arranged overlapping press boss section 7426 in the axial direction. At this time, convex follower cam 7454 provided on boss section 7452 of center hub 745 fits disengageably inside concave operating cam 7424 located on the opposing surface of outer periphery 7426*a* on press boss section 7426.

Operating cam 7424 corresponds to the shape of follower cam 7454 from the opposing surface, and preferably has a concave shape including vertical end surface 7424*a* parallel or substantially parallel to the axial direction and perpendicular or substantially perpendicular to the opposing surface, and inclined surface 7424*b* that is inclined in the circumferential direction.

Operating cam 7424 on second pressure plate 7422 and follower cam 7454 on center hub 745 are arranged to engage by rotating in one direction around the axis about the axial center of first main shaft 71, and to disengage through rotation in the other direction around the axis.

Specifically, operating cam 7424 and follower cam 7454 include inclined surfaces 7424*b* and 7454*b* that slide against each other arranged as surfaces inclined helically about the axial center.

Here, "the other direction around the axis" indicates the opposite direction to the forward torque direction in which torque is transferred from crankshaft 60 via first clutch 74 and drives the rear wheel. Therefore, "the other direction around the axis" in first clutch 74 here is a clockwise direction, opposite to the counterclockwise direction in which forward torque is transferred to drive shaft 73 as viewed from the right side of the vehicle through rotation of first main shaft 71.

Also, as viewed from the left side of the vehicle, "the other direction around the axis" in second clutch 75 is a counterclockwise direction, opposite to the clockwise direction in which forward torque is transferred to drive shaft 73 through rotation of second main shaft 72.

Figure 12:
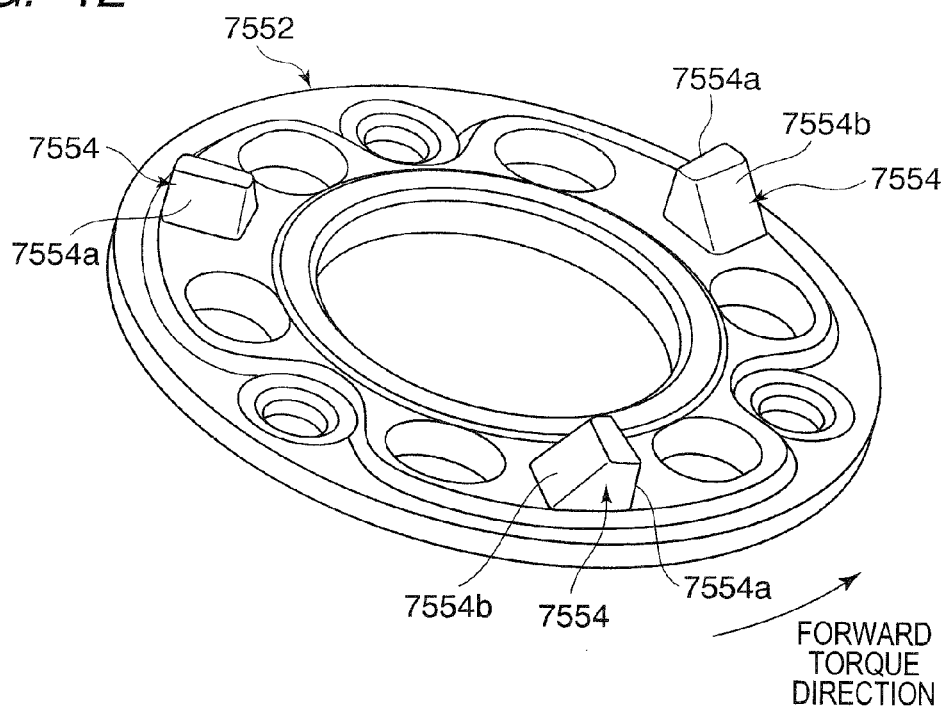
FIG. 12 is a perspective view of a boss section of a center hub in the second clutch as viewed from the opposite surface side.
Figure 13:
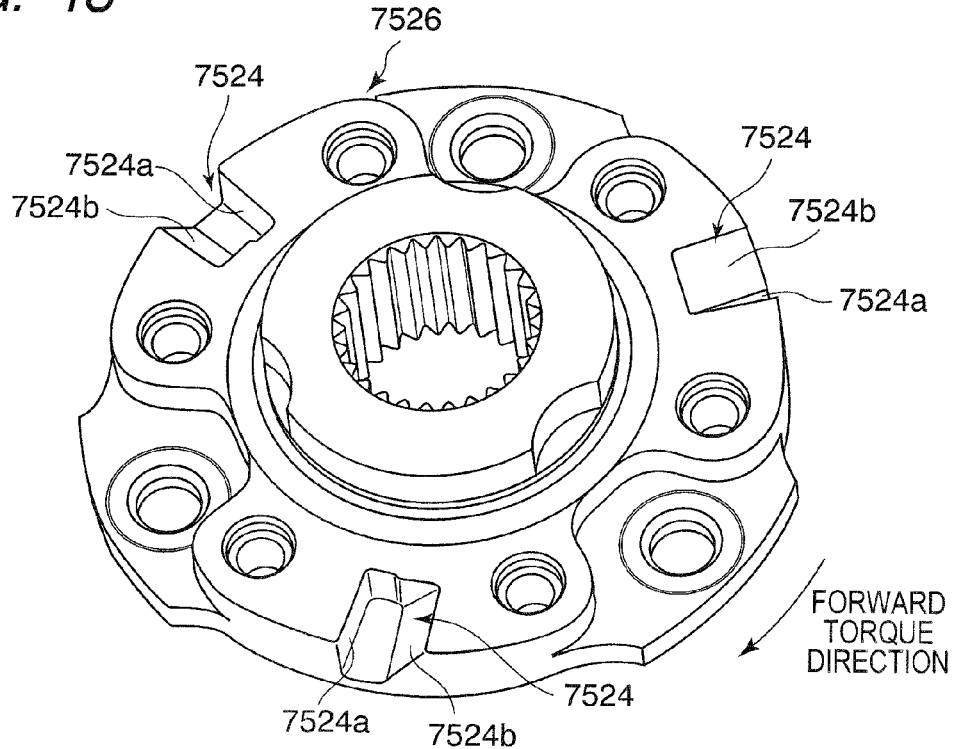
FIG. 13 is a schematic diagram showing an axis arrangement of a crankshaft, a main shaft, and a drive shaft in a transmission according to a preferred embodiment of the present invention, viewed from the right side of the vehicle in the second clutch.

Consequently, with second clutch 75 that has a mirror-symmetric structure with respect to first clutch 74, boss section 7552 of center hub 755 shown in FIG. 12 and press boss section 7526 of the second pressure plate shown in FIG. 13 fit rotatably about the base end 72*a* side of second main shaft 72.

That is to say, with second clutch 72, convex follower cam 7554 and concave operating cam 7524 are provided on opposing surfaces of boss section 7552 shown in FIG. 12 and press boss section 7526 shown in FIG. 13, so that, rotating relatively about the axial center of second main shaft 72, the respective opposing surfaces engage with each other in one direction around the axis (the clockwise direction), and disengage from each other in the other direction around the axis (the counterclockwise direction), as viewed from the left side of the vehicle.

Specifically, operating cam 7524 and follower cam 7554 have contact end surfaces 7524*a* and 7554*a* that are provided on a flat surface passing through the axial center at the clockwise-side end as viewed from the left side of the vehicle, and make surface contact and engage with each other when rotating relatively. Also, operating cam 7524 and follower cam 7554 have inclined surfaces 7524*b* and 7554*b* that are connected to an end in the counterclockwise direction are inclined helically about the axial center, and through the sliding against each other of these inclined surfaces 7524*b* and 7554*b*, boss section 7552 is distanced from press boss section 7526 in the axial direction.

By operation of these operating cams and follower cams rotating relatively and coaxially, the clutches restrict back torque.

FIG. 14 is a schematic diagram showing the relationship between an operating cam of a press boss section and a follower cam of a boss section as viewed from the axial center side. Here, a description will be given using an operating cam of a press boss section and a follower cam of a boss section in the first clutch.

When torque is transferred from crankshaft 60 via first input gear 40 while operating cam 7424 and follower cam 7454 are engaged, in clutch 74 boss section 7452 of center hub 745 rotates in one direction that is the Z direction in which torque is applied (the counterclockwise direction of the main shaft as viewed from the right side of the vehicle). At this time, as shown in FIG. 14A, press boss section 7426 is pressed in the Z direction via follower cam 7454 and operating cam 7424, moves in that direction, and rotates first main shaft 71 in the Z direction.

Also, with this configuration, if a larger force than the torque rotating in the Z direction transferred from boss section 7452 of center hub 745 is applied to press boss section 7426 so that rotation is performed in the other direction around the axis, follower cam 7452 slides over the inclined surface of operating cam 7424 as shown in FIG. 14B. As a result, boss section 7452 moves in a −Z direction with respect to press boss section 7424.

Then follower cam 7454 of boss section 7452 is distanced from operating cam 7424 of press boss section 7426, as shown in FIG. 14C, by sliding farther over the inclined surface of operating cam 7424. As a result, center hub 745 itself moves axially in a direction that distances it from second pressure plate 7422 (toward the base end of first main shaft 71).

Power is taken from the base end of crankshaft 60 via first clutch 74 and second clutch 75 configured in this way, is transferred selectively to first main shaft 71 and second main shaft 72, and is output to rear wheel 12 (see FIG. 1) via drive shaft 73, transmission shaft 79, and propeller shaft 65.

Next, the operation of back torque limiters in clutches 71 and 72 including operating cams 7424 and follower cams 7454 will be described.

FIG. 15 is a drawing provided to explain a back torque limiting operation in the engine unit according to a preferred embodiment of the present invention, being a schematic diagram showing an axis arrangement of a crankshaft, main shaft, and drive shaft in a transmission mounted in a vehicle, viewed from the right side of the vehicle.

This description is based on a view from the right side of the vehicle, so that, when forward torque is applied and normal drive is performed in engine unit 20 having clutches 74 and 75, crankshaft 60 rotates clockwise ("CW") and main shafts (first main shafts 71 and 72) rotate counterclockwise ("CCW") as indicated by the arrow Z direction and drive shaft 73 rotates clockwise (CW) as indicated by the arrow X as shown in FIG. 15.

In the engine unit, of the torque generated by the engine and transferred to clutches 74 and 75, torque that transfers power to drive shaft 73 and that is applied in a direction in which rear wheel 12 rotates in the running direction, is designated "forward torque" for clutch 74 for first main shaft 71.

<When Forward Torque is Applied to a Clutch>

When forward torque is applied, it is assumed, for example, that crankshaft 60 rotates clockwise (in the X direction), the main shaft rotates in the Z direction, and drive shaft 73 rotates in the X direction.

That is to say, power from crankshaft 60 rotating in CW direction X through engine drive is input to clutch housing 740 via first input gear 40, and clutch housing 740 rotates in CCW direction Z about the axial center of first main shaft 71.

When clutch housing 740 rotates in the Z direction, friction plates 744 meshed with inner diameter splines of clutch housing 740 also rotate integrally. Between friction plates 744 are sandwiched a plurality of clutch plates 741 meshed with the outer diameter of center hub 745 via inner diameter splines.

When clutch connection is performed, first pressure plate 7421 is pressed toward second pressure plate 7422 by the force by which clutch spring 743 tries to extend. Consequently, through this pressure, friction plates 744 and clutch plates 741 are pressed toward second pressure plate 7422, pressure operates mutually between friction plates 744 and clutch plates 741, and frictional force is generated.

Through this configuration, when friction plates 744 rotate, center hub 745 rotates via clutch plates 741.

Also, torque from crankshaft 60 is transferred to center hub 745, with torque (that is, a clutch transfer torque capacity) of a magnitude obtained by multiplication of frictional force generated between friction plates 744 and clutch plates 741 and the effective contact perimeter between friction plates 744 and clutch plates 741 (that is, the distance from the approximate center of the contact width to the center of first main shaft 71), as an upper limit.

Cam concavities and convexities are combined on second pressure plate 7422, and center hub 745 is fitted thereto so as to be movable in the axial direction via engagement and disengagement thereof. To be specific, back torque limiter cams (here, concave operating cam 7424 and convex follower cam 7454) provided on the respective opposing surfaces of boss section 7452 of center hub 745 and press boss section 7426 on second pressure plate 7422 each have one surface that defines a surface approximately parallel to the center axis of first main shaft 71, and the other surface that defines an approximately helical surface.

In concave operating cam 7424 and convex follower cam 7454, these "one surfaces" are provided on the drive direction Z end of first main shaft 71, and the "other surfaces" are provided so as to incline toward the reverse Z direction side from the "one surface" side.

Consequently, during engine drive, when clutch housing 740, friction plates 744, clutch plates 741, and center hub 745 are transferring torque in the direction (Z direction) to drive second pressure plate 7422 and first main shaft 71, torque is transferred from center hub 745 to press boss section 7426 of second pressure plate 7422 via a surface approximately parallel to the center axis of cam convexity/concavity first main shaft 71.

<When Reverse Torque is Applied to a Clutch>

Here, reverse torque is a torque applied in a direction reverse to forward torque and indicates torque that makes torque input from engine 6 (see FIG. 1) to clutch housing 740, friction plates 744, clutch plates 741, and center hub 745 via first input gear 40 be in a deceleration direction (the opposite direction to that indicated by arrow Z).

Reverse torque is generated when, in the configuration of the engine unit that takes power from both ends of crankshaft 60 arranged horizontally to left and right, left and right clutches 71 and 72 are both connected while power transfer gears on both the left and right are meshed enabling transfer of power in a shift change or the like, and torque is applied to both clutches. Normally, with transmission mechanism 700 of the engine unit, control is performed by ECU 10 so that a shift change is performed instantaneously by switching from one clutch to the other, and therefore there are no effects due to reverse torque. However, if control by ECU 10 is not performed for some reason at the time of a shift change, torque in the reverse of the rotation direction may be applied to one clutch taking power from one of the both ends of crankshaft 60, via crankshaft 60 and drive shaft 73, from the power transfer including the other clutch (for example, second clutch 75 for first clutch 74).

Here, a case will be described in which reverse torque is applied in the power transfer including one clutch (here, first clutch 74).

With first clutch 74 in this state (see FIG. 8), reverse torque is transferred to center hub 745 from press boss section 7426 of second pressure plate 7422 via an approximately helical surface centered on the center axis of first main shaft 71 that is the other surface that slides in operating cam 7424 and follower cam 7454. That is to say, when reverse torque is transferred in the order of drive shaft 73→first main shaft 71→second pressure plate 7422, follower cam 7454 of center hub 745 moves so as to swell in a helical shape along operating cam 7424 of second pressure plate 7422 due to reverse torque. When follower cam 7454 moves along operating cam 7424 in this way, press boss section 7426 of second pressure plate 7422 and boss section 7452 of center hub 745 move so as to become distanced from each other on the axis line of first main shaft 71 (see FIG. 14).

That is to say, boss section 7452 of center hub 745 including follower cam 7454 rotates about first main shaft 71 and moves toward first pressure plate 7421 in the axial direction of first main shaft 71.

Boss section 7452 of center hub 745 is biased in a direction in which a projection (convexity) of follower cam 7454 is accommodated by a depression (concavity) of operating cam (helical cam) 7424 by leaf spring 746 via nut 747.

Consequently, in clutch 74 prior to the operation of the back torque limiter, center hub 745 continues rotating in the R direction from operating cam (helical cam) 7424 and swells until the R direction component (see FIG. 8) of resistance arising at the other surface (helical cam surface) due to reverse torque, and the pressing force of leaf spring 746, are in balance.

Until one end surface (the opening-side end surface of the cylindrical shape) of center hub 745 that swells in this way reaches first pressure plate 7421, reverse torque is transferred successively to crankshaft 60—that is, engine 6 (see FIG. 1)—from drive shaft 73 via first main shaft 71, press boss section 7426 of second pressure plate 7422, and the helical cam surfaces of operating cam 7424 and follower cam 7454, and via center hub 745, clutch plates 741, friction plates 744, clutch housing 740, and first input gear 40.

When reverse torque further increases, the limiter in clutch 74 operates.

Specifically, when reverse torque further increases, and the end surface (the opening-side end surface of the cylindrical section) of center hub 745 reaches first pressure plate 7421, center hub 745 continues rotating and swells the helical cam surface in the R direction up to a position at which the R direction component of resistance arising at the helical cam surface due to reverse torque, and the resultant force of pressing force of clutch spring 743 added to the bias of leaf spring 746, are in balance.

As a result, the pressing force of clutch spring 743 pressing friction plates 744 and clutch plates 741 against second pressure plate 7422 via first pressure plate 7421 is decreased. Thus, frictional force operating between friction plates 744 and clutch plates 741 is reduced, and the transfer torque capacity of the clutch decreases. At this time, clutch 74 continues reverse torque transfer within a range in which the magnitude of the reverse torque is less than the transfer torque capacity of the clutch for which the pressing force of clutch spring 743 has been reduced. On the other hand, when the magnitude of the reverse torque exceeds the transfer torque capacity of the clutch for which the pressing force of clutch spring 743 has been reduced, friction plates 744 and clutch plates 741 rotate relatively—that is, the clutch slips and reverse torque transfer is limited.

As a result, the clutch transfer torque capacity with respect to reverse torque attains its upper limit while the clutch is slipping, and greater reverse torque than that is not transferred.

Thus, if a predetermined capacity is exceeded when reverse torque is applied to a clutch, the transfer torque capacity with respect to reverse torque can be limited by the operation of a back torque limiter such that first pressure plate 7421 and clutch plates 741 slip with respect to friction plates 744.

In a recovery from this back torque limiter operation, when reverse torque diminishes or when a transition is made to a forward torque state as a result of operating the throttle of engine 6 (see FIG. 1), a change in the rotation speed of drive shaft 73, operating the clutch actuator (78) that operates the other clutch (for example, second clutch 75) or shift mechanism 701, or the like, center hub 745 is pressed back by leaf spring 746 in a direction opposite to the R direction along the inclined surface of the helical cam.

That is to say, center hub 745 moves toward the second pressure plate 7422, the reduced pressing force due to clutch spring 743 is restored, and the transfer torque capacity of first clutch 74 recovers. At this time, mutual boss section cam surfaces 7454b and 7424b or 7454a and 7424a engage, and a state in which torque is transferred by these engaging surfaces is restored.

As shown in FIG. 2 through FIG. 6, gears 711, 721, 85, 86, 712, and 722 that mesh with gears 81, 82, 731, 732, 83, and 84 of drive shaft 73 are located on first main shaft 71 and second main shaft 72 respectively.

Specifically, the following gears are arranged on first main shaft 71 in order from the base end to which first clutch 74 is connected: fixed gear (also referred to as "first-equivalent gear") 711, fifth gear 85, and spline gear (also referred to as "third-equivalent gear") 712. Fixed gear 711 is preferably integral with first main shaft 71, and rotates together with first main shaft 71. Fixed gear 711 meshes with first gear 81 of drive shaft 73, and therefore is also referred to as "first-equivalent gear."

Fifth gear 85 is attached to first main shaft 71, so as to be rotatable about the axis of first main shaft 71 and with its movement regulated in the axial direction, at a position between and at a distance from first-gear fixed gear 711 and third-gear spline gear 712.

Fifth gear 85 meshes with spline gear 731 (also referred to as "fifth-equivalent gear") of drive shaft 73.

Spline gear 712 is attached to first main shaft 71 at the front end of first main shaft 71—that is, at the distant end from first clutch 74—so as to be movable in the axial direction, and rotates together with the rotation of first main shaft 71.

Specifically, spline gear 712 is attached to first main shaft 71, so as to be able to slide in the axial direction while its rotation is regulated, via splines arranged along the axial direction on the outer periphery of the front end of first main shaft 71, and meshes with third gear 83 of drive shaft 73. This spline gear 712 is coupled to shift fork 142, and moves on first main shaft 71 in the axial direction through movement of shift fork 142. Spline gear 712 is also referred to here as "third-equivalent gear."

Spline gear 712 moves toward fifth gear 85 on first main shaft 71 and engages with fifth gear 85, and regulates rotation (idling) about the axis of fifth gear 85 on first main shaft 71. Through the engagement of spline gear 712 with fifth gear 85, fifth gear 85 is fixed to first main shaft 71, and is integrally rotatable together with the rotation of first main shaft 71.

On the other hand, the following gears are arranged on second main shaft 72 in order from the base end to which second clutch 75 is connected: fixed gear (also referred to as "second-equivalent gear") 721, sixth gear 86, and spline gear (also referred to as "fourth-equivalent gear") 722.

Fixed gear 721 is preferably integral with second main shaft 72, and rotates together with second main shaft 72. Fixed gear 721 meshes with second gear 82 of drive shaft 73, and therefore is also referred to as "second-equivalent gear."

Sixth gear 86 is attached to second main shaft 72, so as to be rotatable about the axis of second main shaft 72 and with its movement regulated in the axial direction, at a position between and at a distance from second-gear fixed gear 721 and fourth-gear spline gear 722. Sixth gear 86 meshes with spline gear 732 (also referred to as "sixth-equivalent gear") of drive shaft 73.

Spline gear (fourth-equivalent gear) 722 is attached to second main shaft 72 at the front end of second main shaft 72—that is, at the distant end from second clutch 75—so as to be movable in the axial direction, and rotates together with the rotation of second main shaft 72.

Specifically, spline gear 722 is attached to second main shaft 72, so as to be able to slide in the axial direction while its rotation with respect to second main shaft 72 is regulated, via splines arranged along the axial direction on the outer periphery of the front end of second main shaft 72, and meshes with fourth gear 84 of drive shaft 73. Spline gear 722 is coupled to shift fork 143, and moves on second main shaft 72 in the axial direction through movement of shift fork 143.

Spline gear 722 moves toward sixth gear 86 on second main shaft 72 and engages with sixth gear 86, and regulates turning (idling) about the axis of sixth gear 86 on second main shaft 72. Through the engagement of spline gear 722 with sixth gear 86, sixth gear 86 is fixed to second main shaft 72, and is integrally rotatable together with the rotation of second main shaft 72.

Meanwhile, the following gears are arranged on drive shaft 73 shown in FIG. 2 and FIG. 5 in order from the first clutch 74 side: first gear 81, spline gear (fifth-equivalent gear) 731, third gear 83, fourth gear 84, spline gear (sixth-equivalent gear) 732, second gear 82, and middle gear 76.

On drive shaft 73, first gear 81, third gear 83, fourth gear 84, and second gear 82 are provided rotatably about drive shaft 73 in a state in which their movement in the axial direction of drive shaft 73 is inhibited.

Spline gear (fifth-equivalent gear) 731 is attached to drive shaft 73 so as to be able to slide in the axial direction while its rotation is regulated via spline engagement. That is to say, spline gear 731 is attached so as to be movable in a sliding direction with respect to drive shaft 73, and also rotates together with drive shaft 73. This spline gear 731 is coupled to shift fork 141 of shift mechanism 701, and moves on drive shaft 73 in the axial direction through the movement of shift fork 141.

Spline gear (sixth-equivalent gear) 732 is attached to drive shaft 73 so as to be able to slide in the axial direction while its turning is regulated via spline engagement. That is to say, spline gear (sixth-equivalent gear) 732 is attached so as to be movable in a sliding direction with respect to drive shaft 73, and also rotates together with drive shaft 73. This spline gear 732 is coupled to shift fork 144 of shift mechanism 701, and moves on drive shaft 73 in the axial direction through the movement of shift fork 144.

These spline gears 712, 722, 731, and 732 function as transmission gears, and also function as dog selectors. Spline gears 712, 722, 731, and 732 are coupled via a dog mechanism to respective transmission gears (first gear 81 through sixth gear 86) that are adjacent in the axial direction by moving in the axial direction. That is to say, mutually fitting concave and convex portions are provided on mutually opposing surfaces of spline gears 712, 722, 731, and 732 and transmission gears adjacent in the axial direction, and both gears rotate integrally through the fitting together of the concave and convex sections.

A description will now be given of the gear positions from first gear through sixth gear with gears 711, 721, 85, 86, 712, and 722 provided on first and second main shafts 71 and 72 and gears 81, 82, 731, 732, 83, and 84 provided on drive shaft 73.

In the first gear position, spline gear (third-equivalent gear) 712 on first main shaft 71 is distanced from fifth gear 85, and meshes with third gear 83 on drive shaft 73. Also, spline gear (fifth-equivalent gear) 731 on drive shaft 73 moves toward first gear 81 and is distanced from third gear 83, and fits together and coupled with first gear 81. As a result, first gear 81 is put into a state in which it is fixed integrally to drive shaft 73 via spline gear 731. At this time, third gear 83 meshing with spline gear 712 of first main shaft 71 and fifth gear 85 meshing with spline gear 731 of drive shaft 73 enter a state in which they idle about the respective axes.

In the second gear position, spline gear (fourth-equivalent gear) 722 on second main shaft 72 is distanced from sixth gear 86, and meshes with fourth gear 84 on drive shaft 73. Also, spline gear (sixth-equivalent gear) 732 on drive shaft 73 moves toward second gear 82 and is distanced from fourth gear 84, and fits together and coupled with second gear 82. As a result, second gear 82 is put into a state in which it is fixed integrally to drive shaft 73 via spline gear 732. At this time, fourth gear 84 meshing with spline gear 722 of second main shaft 72 and sixth gear 86 meshing with spline gear 732 of drive shaft 73 enter a state in which they idle about the respective axes.

In the third gear position, spline gear (third-equivalent gear) 712 on first main shaft 71 is distanced from fifth gear 85, and meshes with third gear 83 on drive shaft 73. Also, spline gear (fifth-equivalent gear) 731 on drive shaft 73 moves toward third gear 83 and is distanced from first gear 81, and fits together and is coupled with third gear 83. As a result, third gear 83 is put into a state in which it is fixed integrally to drive shaft 73 via spline gear 731. At this time, first gear 81 meshing with fixed gear 711 of first main shaft 71 and fifth gear 85 meshing with spline gear 731 of drive shaft 73 enter a state in which they idle about the respective axes.

In the fourth gear position, spline gear (fourth-equivalent gear) 722 on second main shaft 72 is distanced from sixth gear 86, and meshes with fourth gear 84 on drive shaft 73. Also, spline gear (sixth-equivalent gear) 732 on drive shaft 73 moves toward fourth gear 84 and is distanced from second gear 82, and fits together and is coupled with fourth gear 84. As a result, fourth gear 84 is put into a state in which it is fixed integrally to drive shaft 73 via spline gear 732. At this time, second gear 82 meshing with fixed gear 721 of second main shaft 72 and sixth gear 86 meshing with spline gear 732 of drive shaft 73 enter a state in which they idle about the respective axes.

In the fifth gear position, spline gear (third-equivalent gear) 712 on first main shaft 71 moves toward fifth gear 85 and is coupled by fitting together with fifth gear 85, and that fifth gear 85 is put into a state in which it is fixed integrally to the first main shaft via spline gear 712. Also, spline gear (fifth-equivalent gear) 731 on drive shaft 73 is distanced from both first gear 81 and third gear 83, and meshes with fifth gear 85 at a position at which it is not coupled to either. At this time, first gear 81 and third gear 83 on drive shaft 73 meshing with fixed gear 711 and spline gear 712 of first main shaft 71 enter a state in which they idle about the axis of drive shaft 73.

In the sixth gear position, spline gear (fourth-equivalent gear) 722 on second main shaft 72 moves toward sixth gear 86 and is coupled by fitting together with sixth gear 86, and that sixth gear 86 is put into a state in which it is fixed integrally to second main shaft 72 via spline gear 722. Also, spline gear 732 on drive shaft 73 is distanced from both second gear 82 and fourth gear 84, and meshes with sixth gear 86 at a position at which it is not coupled to either. At this time, second gear 82 and fourth gear 84 on drive shaft 73 meshing with fixed gear 721 and spline gear 722 of second main shaft 72 enter a state in which they idle about the axis of drive shaft 73.

Thus, gear shifting is performed in transmission 7 by moving spline gears 712, 722, 731, and 732 of transmission mechanism 700 as appropriate in the axial direction via shift forks 141 through 144.

Next, a description will be given of shift mechanism 701 that performs gear shifting by moving spline gears 712, 722, 731, and 732 of transmission mechanism 700 in the axial direction via shift forks 141 through 144 in transmission 7.

(2-4) Shift Mechanism of Transmission

Shift mechanism 701 shown in FIG. 2 includes elongated shift forks 141 through 144 coupled to spline gears 731, 712, 722, and 732 at the front end, cylindrical shift cam 14 that has its rotation axis arranged parallel or substantially parallel to first and second main shafts 71 and 72 and drive shaft 73, and moves shift forks 141 through 144 in the axial direction of that rotation axis by rotating, shift cam drive unit 800 that provides rotational driving of shift cam 14, motor 8, and transmission mechanism 41 that couples motor 8 to shift cam drive unit 800 and transfers the driving force of motor 8.

Shift forks 141 through 144 are installed between spline gears 731, 712, 722, and 732 and shift cam 14, and are distanced from each other in the axial direction of first and second main shafts 71 and 72, drive shaft 73, and shift cam 14. These shift forks 141 through 144 are arranged so as to be parallel to each other, and are each arranged movably in the axial direction of the rotation axis of shift cam 14.

Shift forks 141 through 144 include pin sections at the base end, arranged so as to be movable respectively within four cam grooves 14a through 14d provided in the outer periphery of shift cam 14. That is to say, shift forks 141 through 144 are follower members of shift cam 14, which is the driving source, and slide in the axial direction of first and second main shafts 71 and 72 and drive shaft 73 in accordance with the shape of cam grooves 14a through 14d of shift cam 14. As a result of this sliding movement, spline gears 731, 712, 722, and 732 coupled to the front end each move in the axial direction on shafts passing through the respective inner diameters.

Shift cam 14 is rotated by the driving force of motor 8 transferred to shift cam drive unit 800 via drive mechanism 41, and through this rotation, at least one of shift forks 141 through 144 is moved in accordance with the shape of cam grooves 14a through 14d.

As a result of shift forks 141 through 144 that move in response to the rotation of shift cam 14 including cam grooves 14a through 14d, a spline gear coupled to a moved shift fork moves, and a gear shift of transmission 7 (transmission mechanism 700) is performed.

In this preferred embodiment, when the rider depresses the shift-up button or shift-down button of shift switch 15, a signal indicating that fact (hereinafter referred to as a "shift signal") is output from shift switch 15 to ECU 10. Based on the input shift signal, ECU 10 controls first and second clutch actuators 77 and 78 and motor 8. As a result of this control, either first clutch 74 or second clutch 75, or both first and second clutches 74 and 75, is/are disengaged, shift cam 14 rotates, and a gear shift in transmission 7 (transmission mechanism 700) is performed.

Figure 16:
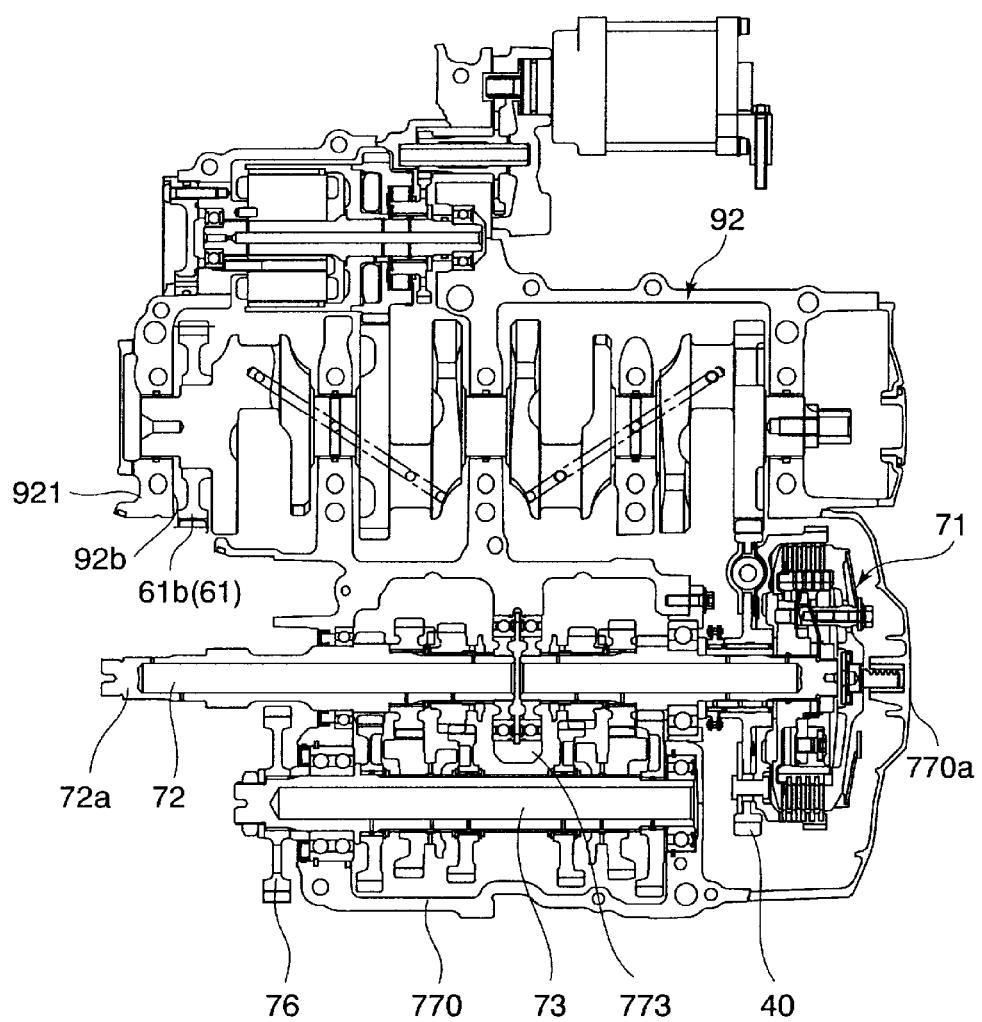
FIG. 16 is a plan sectional view showing a state in which a clutch cover, a second clutch, and a bell housing are removed in an engine unit according to a preferred embodiment of the present invention.

FIG. 16 is a side view showing a state in which clutch cover 770b covering second clutch 74, second clutch 74, and bell housing 930 are removed in a vehicle including engine unit 20 according to a preferred embodiment of the present invention.

As shown in FIG. 16, in engine unit 20, it is possible to remove propeller shaft case 66 and propeller shaft 65 and it is possible to remove clutch cover 770b, second clutch 74, and bell housing 930 from mission case 770.

Furthermore, in engine unit 20, it is possible to perform the maintenance of second clutch 75 by removing only clutch cover 770b without removing propeller shaft case 66, propeller shaft 65, bell housing 930, and transmission shaft 79.

Also, second clutch 75 can be exposed on one side of the vehicle simply by removing clutch cover 770b covering second clutch 75 on the axially outward other side (the left side). As a result, second clutch 75 maintenance can be performed easily without removing the engine unit from the frame by removing clutch cover 770b, which is a portion of the clutch case accommodating second clutch 75, even after the engine unit has been mounted on the vehicle. As with the case of second clutch 75, also for first clutch 74, maintenance can be performed with first clutch 74 exposed simply by removing clutch cover 770a.

After the vehicle is loaded with engine unit 20 in which together with engine 6 and crankshaft 60, first main shaft 71, second main shaft 72, drive shaft 73, transmission shaft 79, gears 76, 81 to 86, 711, 712, 721, 722, 731, 732, 791 that perform power transfer between shafts 71 to 73 and 79, bell housing 930 and the like are arranged, propeller shaft case 66 can be attached on the lateral side (the left side) of the vehicle and propeller shaft 65 can be installed.

Transmission 7 of the present preferred embodiment includes first clutch 74 that inputs rotation power transferred from crankshaft 60 to first main shaft 71 and outputs driving force to the driving wheel side via an odd-numbered transmission gear mechanism (gears 81, 83, 85, 711, 712, and 731) set as odd-numbered transmission gears, and second clutch 75 that inputs rotation power transferred from crankshaft 60 to second main shaft 72 and outputs driving force to rear wheel 12 via an even-numbered transmission gear mechanism (gears 82, 84, 86, 721, 722, and 732) set as even-numbered transmission gears.

First clutch 74 and second clutch 75 are arranged in approximately symmetrical positions approximately equidistant from a central plane passing through the lengthwise center of crankshaft 60 and perpendicular or substantially perpendicular to crankshaft 60, and have power transferred to them from each end of crankshaft 60 respectively. First main shaft 71 and second main shaft 72 are arranged at positions on the same axis line parallel or substantially parallel to crankshaft 60, with transmitting portions of the driving force when output to the driving wheel via an odd-numbered transmission gear mechanism and even-numbered transmission gear mechanism respectively not overlapping coaxially on first main shaft 71 and second main shaft 72. The outer axial diameters of the driving force transmitting portions on first main shaft 71 and second main shaft 72 are the same. Consequently, a double-pipe structure defined by first main shaft 71 and second main shaft 72 is not adopted and it is unnecessary to make one outer diameter larger the other outer diameter in first main shaft 71 and second main shaft 72. Accordingly, it is not necessary to make the diameters of gears (fixed gears, transmission gears, and spline gears) attached to first main shaft 71 and second main shaft 72 larger. That is to say, the freedom of gear ratio settings for gears 711, 85, 712, 721, 86, and 722 arranged on first main shaft 71 and second main shaft, and gears 81, 731, 83, 82, 732, and 84 arranged on drive shaft 73 that mesh with those gears, is not restricted.

Also, since the diameters of gears provided on first and second main shafts 71 and 72 can be made smaller, the diameters of gears (gears provided on drive shaft 73) that mesh with those gears can be made smaller. As a result, the distance between first and second main shafts 71 and 72 and drive shaft 73 can be made smaller, and transmission 7 can be reduced in size.

In particular, with transmission 7 of an engine unit of the present preferred embodiment, since first main shaft 71 and second main shaft 72 are arranged rotatably on the same axis line and facing the respective end surfaces, they are separated from each other, and when mounted on a motorcycle, main shafts having the same outer diameter as an existing main shaft can be used as first main shaft 71 and second main shaft 72.

Also, since first main shaft 71 and second main shaft 72 are provided on approximately the same axis line, the distance between first main shaft 71 and drive shaft 73, or the distance between second main shaft 72 and drive shaft 73, does not become larger.

As a result, an engine unit of the present preferred embodiment can be mounted on a motorcycle without changing the distances between the crankshaft, main shafts, and drive shaft in that motorcycle. Therefore, the drive unit can be mounted without constraints on the vehicle dimensions of an existing motorcycle and without changing the wheel base of the motorcycle, and can be mounted without significantly changing the frame and so forth of the motorcycle.

Furthermore, in the present preferred embodiment, first clutch 74 and second clutch 75 are arranged so as to face each other, and first and second main shafts 71 and 72 are provided between first clutch 74 and second clutch 75. As a result, the center of motorcycle 100 in the lateral direction and the position of the center of gravity of transmission mechanism 700 are not significantly distanced from each other.

Therefore, even if transmission 7—that is, an engine unit—is mounted on motorcycle 100, the weight of motorcycle 100 does not deviate to either the left or right and the lateral balance of motorcycle 100 can easily be stabilized, and the driving feeling of motorcycle 100 can be improved.

Also, first clutch 74 and second clutch 75 are arranged in approximately symmetrical positions approximately equidistant from a central plane passing through the lengthwise center of crankshaft 60 and perpendicular or substantially perpendicular to crankshaft 60. To be specific, first clutch 74 and second clutch 75 are connected to the ends farthest from each other (the base ends) of first main shaft 71 and second main shaft 72, respectively, arranged on the same axis line parallel to crankshaft 60, and are arranged at positions separated by a predetermined distance perpendicular or substantially perpendicular to the axial direction of crankshaft 60 with respect to either end of crankshaft 60 respectively.

As a result, the degrees of projection in the vehicle width direction of portions (clutch case side clutch covers 770a and 770b) covering first clutch 74 and second clutch 75 in the chassis of the engine unit accommodating first clutch 74 and second clutch 75 are approximately equal lengths with respect to a central plane passing through the lengthwise center and perpendicular or substantially perpendicular to the axis of crankshaft 60 of the engine unit. Consequently, the engine unit can be mounted on motorcycle 100 with a perpendicular plane passing through the approximate lengthwise center of crankshaft 60 in the engine unit aligned with the central plane of the body of motorcycle 100. Therefore, bank angle θ formed by the degree of projection of each of clutch covers 770a and 770b can also be made narrow, and the posture of the rider is not constrained.

Also, in the present preferred embodiment, first main shaft 71, second main shaft 72, first clutch 74, and second clutch 75 are disposed higher than crankshaft 60 and drive shaft 73. In this case, the width of the lower portion of motorcycle 100 can be prevented from becoming large. As a result, the bank angle of motorcycle 100 can be made large, and the driving feeling of motorcycle 100 can be further improved.

Furthermore, since heavy first clutch 74 and second clutch 75 are arranged in the engine unit at approximately laterally symmetrical positions about the center of gravity of the engine unit, it is not necessary to make the shape of the frame of motorcycle 100 in which the engine unit is mounted different between the left and the right, and good lateral rigidity can easily be provided in the frame.

Moreover, since first main shaft 71 and second main shaft 72 are provided separately, if one of the two power transfer paths (the path via first main shaft 71 and the path via second main shaft 72) that transfer torque from engine 6 to drive shaft 73 cannot be used, driving force can be output to rear wheel 12 using the other path.

Also, in the present preferred embodiment, first input gear 40 meshes with crank web 61 located at one end of crankshaft 60, and second input gear 50 meshes with crank web 61 located at the other end of crankshaft 60. In this case, it is possible to prevent the center of gravity of engine 6 and the center of gravity of transmission mechanism 700 from being significantly distanced from each other. As a result, the lateral balance of motorcycle 100 can be still more easily stabilized.

Furthermore, in the present preferred embodiment, middle gear 76 is provided in an area between second input gear 50 and second gear 82 arranged in the lateral direction. In this case, middle gear 76 can be provided on drive shaft 73 without the center of transmission mechanism 700 in the lateral direction being significantly distanced from the center of motorcycle 100 in the lateral direction. As a result, the width of motorcycle 100 can be prevented from becoming overly large.

Moreover, as shown in FIG. 5, middle gear 76 is arranged so as to be exposed outside drive unit case 920. Specifically, middle gear 76 is attached to one end (the left end) of drive shaft 73 that projects rotatably from one side (the left side) of drive unit case 920.

That is to say, middle gear 76 itself is arranged in a state in which it projects externally on one side (the left side) of drive unit case 920. Drive unit case 920 accommodates crankshaft 60, first main shaft 71, an odd-numbered transmission gear mechanism (gears 81, 83, 85, 711, 712, and 731), first clutch 74, second main shaft 72, an even-numbered transmission gear mechanism (gears 82, 84, 86, 721, 722, and 732), second clutch 75, and drive shaft 73.

In this drive unit case 920, as shown in FIG. 5, second main shaft 72 is arranged such that its one (left) end, that is, base end 72a, projects toward one (left) side from drive unit case 920 beyond one (left) end of drive shaft 76, the one end of the drive shaft 76 pointing in the same direction as the one end of the main shaft 72.

Second clutch 75 is connected detachably to one (left) end, that is, base end 72a, of second main shaft 72, at a position overlapping portion of middle gear 76 sideways with respect to the axis (on the left side) of drive shaft 76. A power transmitting portion that meshes with second input gear 50 connected to second clutch 75 and transfers rotation power from the crankshaft 60 side, is provided in through hole 940 that penetrates the junction section between bell housing body 931 (partition member) and drive unit case 920. Consequently, when second clutch 75 is removed from second main shaft 72, second input gear 50 is likewise moved in the axial direction, so that the meshed state of second clutch 75 with the power transmitting portion is disengaged and second clutch 75 can be easily removed.

Therefore, second clutch 75 is accommodated in a clutch case defined by clutch cover 770b that covers from the side, and bell housing body (casing member) 931 that is arranged to partition between second clutch 75 and middle gear 76.

Also, in the present preferred embodiment, in the standard state of each gear position, either the odd-numbered gear group or the even-numbered gear group is held in a neutral position. This enables motorcycle 100 to be driven while first and second clutches 74 and 75 are both connected.

Therefore, when motorcycle 100 is running in a certain gear position, it is not necessary to keep driving first and second clutch actuators 77 and 78. This makes it possible to extend the life of first and second clutch actuators 77 and 78, and release bearings 70a and 80a, and also enables control of first and second clutch actuators 77 and 78 by ECU 10 to be simplified.

Also, in the present preferred embodiment, when the gear position is switched, first and second clutches 74 and 75 are both put into a half-clutch state. In this case, torque of middle gear 76 can be prevented from changing suddenly. As a result, speed change in the motorcycle is much more comfortable. Also, when the gear position is switched, transfer of torque from crankshaft 60 to middle gear 76 is not blocked, making a quick and smooth gear change operation possible.

Gear reduction ratios of first input gear 40 and second input gear 50 may be the same or may be different.

If the gear reduction ratio of first input gear 40 and the gear reduction ratio of second input gear 50 are made the same, the clutch capacity (the maximum torque at which clutch slippage is prevented) of first clutch 74 and the clutch capacity of second clutch 75 can be made equal. As a result, commonality of elements and components can be achieved for first clutch 74 and second clutch 75, and the production cost of motorcycle 100 can be reduced.

On the other hand, if the gear reduction ratio of first input gear 40 and the gear reduction ratio of second input gear 50 are made different, the difference between the gear ratio of torque transferred to drive shaft 73 via first clutch 74 and the gear ratio of torque transferred to drive shaft 73 via second clutch 75 can be made large. As a result, the range of gear ratios in transmission mechanism 700 can be increased, and the running performance of motorcycle 100 is improved.

Also, the clutch capacity of the clutch that is not normally used when motorcycle 100 starts moving—that is, second clutch 75—may be made smaller than the clutch capacity of first clutch 74. In this case, it is possible to make transmission mechanism 700 smaller and lighter. Moreover, the moment of inertia about the axis extending in the front-back direction of transmission mechanism 700 can be made smaller, improving the running performance of motorcycle 100.

In the above-described preferred embodiment, torque of crankshaft 60 is preferably transferred to first and second clutches 74 and 75 via crank webs 61a and 61b, but the method of torque transfer from crankshaft 60 to first and second clutches 74 and 75 is not limited to the above example. For example, two gears for torque transfer may be provided on crankshaft 60, and torque of crankshaft 60 may be transferred to first and second clutches 74 and 75 via those two gears.

Furthermore, with an engine unit according to the present preferred embodiment, in transmission 7, lubricating oil that is supplied in the space inside flange section 773 is preferably branched between cavity section 781 and cavity section 782 and then supplied to first clutch 74 and second clutch 75. As a result, lubricating oil can be supplied equal between first clutch 74 and second clutch 75. In this case, inadequate lubrication of either one of first and second clutches 74 and 75 can be prevented, and an improvement in the durability of first and second clutches 74 and 75 can be achieved.

In the above preferred embodiments, a case has been described in which the engine unit of the present preferred embodiment is preferably applied to a motorcycle as an example of a vehicle, but the present invention is by no means limited to this, and may also be applied to other vehicles, such as a 3-wheeled motor vehicle or a 4-wheeled motor vehicle, for example.

In the above preferred embodiments, transmission 7 has been described that preferably enables the gear ratio to be changed in six steps (first gear through sixth gear), but the gear ratio of transmission 7 may also be set to five steps or less, or to seven steps or more. The number of gears provided on first main shaft 71, second main shaft 72, and drive shaft 73 is adjusted appropriately according to the number of gear ratio steps set in transmission 7.

Also, in the above preferred embodiments, first clutch 74 and second clutch 75 are preferably of wet multi-plate friction transmission type, but they may be of single plate, multi-plate, wet, or dry type, and may also be centrifugal clutches or the like, for example.

The disclosed contents of the specification, drawings and abstract of Japanese Patent Application No. 2010-100314, filed on Apr. 23, 2010, are incorporated in their entirety herein by reference.

An engine unit according to various preferred embodiments of the present invention provides the advantage that it can be made small even though it includes a plurality of clutches, and is useful as an engine unit to be loaded on a motorcycle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An engine unit comprising:
a crankshaft extending in a lateral direction or an approximately lateral direction of a vehicle;
an output shaft that is parallel or substantially parallel to the crankshaft;
at least one main shaft section that is parallel or substantially parallel to the output shaft, rotates due to rotation power transferred from the crankshaft, and outputs the rotation power to the output shaft via a transmission gear mechanism;
at least one clutch that connects and disconnects the rotation power transferred from the crankshaft to the at least one main shaft section;
a transmission shaft that is parallel or substantially parallel to the output shaft and rotates due to the rotation power from the output shaft;
a propeller shaft that extends in a front-back direction of the vehicle and rotates due to the rotation power from the transmission shaft and drives a rear wheel; and
a drive unit case in which the crankshaft, the at least one main shaft section, the transmission gear mechanism, the output shaft, the transmission shaft, and the propeller shaft are provided in a rotatable fashion; wherein
the at least one main shaft section is arranged in the drive unit case such that one end of the at least one main shaft section projects from the drive unit case beyond one end of the output shaft, the one end of the output shaft pointing in a same direction as the one end of the at least one main shaft section;
the transmission shaft is arranged such that the rotation power is transmitted via an intermediate gear provided at the one end of the output shaft in the lateral direction;
the at least one clutch is arranged at a same side where the propeller shaft is arranged in the lateral direction or the approximately lateral direction of the vehicle and is detachably connected to the one end of the at least one main shaft section at a position in which the at least one clutch overlaps with at least a portion of the intermediate gear axially sideways from the output shaft.

2. The engine unit according to claim 1, wherein the drive unit case is detachably provided with a partition member that extends through the one end of the at least one main shaft section between the at least one clutch and the intermediate gear axially spaced from each other, constitutes a portion of a case that houses the at least one clutch, and partitions the at least one clutch and the intermediate gear.

3. The engine unit according to claim 1, wherein the at least one main shaft section includes a plurality of main shaft sections that are arranged side by side laterally on a same axis line and output the rotation power to the output shaft via each of transmission gear mechanisms of odd-numbered and even-numbered transmission gears, and the at least one clutch includes a plurality of clutches that correspond to the plurality of main shaft sections.

4. The engine unit according to claim 1 in combination with the vehicle, wherein the vehicle is a motorcycle.

5. An engine unit comprising:
a crankshaft extending in a lateral direction or an approximately lateral direction of a vehicle;
an output shaft that is parallel or substantially parallel to the crankshaft;
at least one main shaft section that is parallel or substantially parallel to the output shaft, rotates due to rotation power transferred from the crankshaft, and outputs the rotation power to the output shaft via a transmission gear mechanism;
at least one clutch that connects and disconnects the rotation power transferred from the crankshaft to the at least one main shaft section;
a transmission shaft that is parallel or substantially parallel to the output shaft and rotates due to the rotation power from the output shaft;
a propeller shaft that extends in a front-back direction of the vehicle and rotates due to the rotation power from the transmission shaft and drives a rear wheel; and
a drive unit case in which the crankshaft, the at least one main shaft section, the transmission gear mechanism, the output shaft, the transmission shaft, and the propeller shaft are provided in a rotatable fashion; and
a bell housing, wherein
the at least one main shaft section is arranged in the drive unit case such that one end of the at least one main shaft section projects from the drive unit case beyond one end of the output shaft, the one end of the output shaft pointing in a same direction as the one end of the at least one main shaft section;
the transmission shaft is arranged such that the rotation power is transmitted via an intermediate gear provided at the one end of the output shaft in the lateral direction;
the at least one clutch is detachably connected to the one end of the at least one main shaft section at a position in which the at least one clutch overlaps with at least a portion of the intermediate gear axially sideways from the output shaft;
the drive unit case is detachably provided with a partition member that extends through the one end of the at least one main shaft section between the at least one clutch and the intermediate gear axially spaced from each other, constitutes a portion of a case that houses the at least one clutch, and partitions the at least one clutch and the intermediate gear; and
the partition member constitutes a portion of the bell housing that houses the at least one clutch, the bell housing being provided detachably on the drive unit case body.

6. The engine unit according to claim 5, wherein the bell housing is provided with a bearing that pivotally supports the transmission shaft.

7. The engine unit according to claim 5, wherein in an area on a side where the at least one clutch is provided in the at least one main shaft section, an input gear is detachably provided between the at least one clutch and the partition member, the input gear is arranged to transmit the rotation power from the crankshaft to the at least one clutch by rotating around a same axis line as the at least one main shaft section, and in a joint portion of the partition member and the drive unit case, a through hole is provided through the joint portion, and a power transmission portion that meshes with the input gear to transmit the rotation power to the at least one clutch is located in the through hole.

* * * * *